Inventor.
RICHARD MERCER

Inventor.
RICHARD MERCER

June 12, 1956

R. MERCER 2,750,448

TELECOMMUNICATION SYSTEMS

Filed May 14, 1951

Inventor:
RICHARD MERCER

By
Lippincott & Smith
Attorneys.

June 12, 1956 R. MERCER 2,750,448

TELECOMMUNICATION SYSTEMS

Filed May 14, 1951 22 Sheets-Sheet 22

Inventor,
RICHARD MERCER.

By
Lippincott & Smith.
Attorneys.

United States Patent Office 2,750,448
Patented June 12, 1956

2,750,448

TELECOMMUNICATION SYSTEMS

Richard Mercer, Putney, London, England

Application May 14, 1951, Serial No. 226,131

Claims priority, application Great Britain May 31, 1950

13 Claims. (Cl. 179—18)

The present invention concerns improvements in or relating to telecommunication systems in which connections are adapted to be set up automatically.

The invention is particularly concerned with the use of multiposition switching devices each of which has a plurality of outlets, each having a different numerical significance corresponding either to a different line or a different group of lines, whether of a set of incoming or a set of outgoing lines. In single isolated exchanges the incoming or outgoing lines would correspond to subscribers' lines and would therefore be identical. In exchange networks the incoming lines to an exchange would include lines incoming from other exchanges as well as subscribers' lines. As it is usual for junction lines to be one way, incoming and outgoing junction lines are usually different.

The object of the invention is to provide an exchange by which any incoming line can be connected to any outgoing line over any one of a limited number of routes which are common to the whole exchange, so that knowing the number of the calling and called lines, which need not necessarily be directory numbers and having selected one of such routes over which the said lines can be connected together, all the switches in the route are known and can be operated to complete the connection. By employing finder selector links, so that a connection can be established from a finder selector link over one or more of a series of switches in tandem to a calling or incoming line, which switches are generally termed "finder switches," and over one or a series of switches to a called or outgoing line which switches are generally termed "selector switches," it is possible to employ switches which are similar both as finders and selectors and in fact the finder switches and selector switches giving direct access to a number of subscribers' lines corresponding to the capacity of such switches may be identical. Such switches are frequently referred to as "finder-final switches."

It is usual when employing finder selector links in established automatic telephone systems to have such links accessible to a group only of incoming lines over one or two stages of finder switches and to all the outgoing lines over one or more stages of selector switches and one or more stages of non-numerical switches and the present invention is directed not only to arranging links of finder and selector switches in the manner described, but arranging that such switches other than those individual to a series of links serving a particular group of incoming lines are connected up in a special manner so as to enable all switches in the main train to have outlets of different numerical significance only, whereby hunting or purely non-numerical switches are eliminated from the main train and hunting and selection of an available route is effected in registering or other equipment common to a number of possible routes.

According to the invention any of a first set of lines (e. g. subscribers' lines or subscribers' lines and lines from other exchanges) may be connected to any of a second set of lines (e. g. subscribers' lines or subscribers' lines and lines to other exchanges), which lines of each set correspond in whole or in part, the first set of lines being divided into a plurality of groups, each group being accessible to a series of finder-selector links over one or more stages of finder switches, each outlet of each finder switch having a different numerical significance identifying a line or a particular number of lines of the group, each finder-selector link also having access over selector switches in one or more stages to any of the second set of lines, each outlet of each selector switch having a different numerical significance identifying a line or a particular number of lines of the second set, and selected finder selector links each having access over a finder switch or switches to a different group of said first set of lines are given access to selectors whose corresponding outlets are multipled together.

In the event of traffic being substantially equally distributed among outlets of the different numerical significances of a particular stage, the number of finder selector links which have access to selectors whose corresponding outlets (i. e. of the same numerical significance) are multipled together, will until the total number of groups of said first set of lines is reached correspond to the total number of outlets of different numerical significance at that stage, that is to say the first selector switch has A outlets and for equal traffic distribution the number of finder-selector links having their corresponding outlets multipled together would be A. In the case of second stage selectors it would be $A^2$ and so on. Where traffic is sufficiently light as in the case of finder and selector switches giving direct access to subscribers' lines, selected outlets of finder switches and selector switches other than those connected directly to lines of said first and second sets and accessible from a selected plurality of finder selectors of the same series are multipled together.

Where finder switches are provided in two stages for giving access between a series of finder selector links and a group of subscribers' lines included in the first set of lines, the maximum number of subscribers in such group is determined by the product of the capacity of the finder switches of each stage, while where finder switches are provided in one stage only for giving access from a series of finder-selector links to a group of lines incoming from another exchange included in said first set of lines, the maximum number of lines in such groups is determined by the capacity of the finder switch.

In the case of calls outgoing to other exchanges, selected first stage selectors each associated with a finder-selector link serving a different group of said first set of lines may have an outlet or outlets with corresponding numerical significances multipled together and connected either directly to a line outgoing to the desired exchange or via a non-numerical selector switch to a number of such lines depending upon the number of lines outgoing from the exchange corresponding to the numerical significance of the required exchange.

According to a subsidiary feature of the invention the control for effecting the setting up of a connection from a line of one set to a line of another set is effected from a registering device taken into use and connected to a finder selector link on the initiation of the call to ascertain the designation of the lines to be connected together and thereafter to select a finder-selector link and switches to which the selected link has access available for setting up a connection between said lines, which register device subsequently effects the operation of the selected switches to complete the desired connection. In order to enable a choice to be made between the link used for connecting the calling line to the register and the other links available for setting up the desired connection, the first finder-selector link and the finder switch or switches used for connecting the calling line to a registering device are made available when testing for a through connection, and according to another subsidiary feature of the invention the registering device after setting up a complete connection is released for use for setting up other calls, together with the finder-selector link and any finder switches used for connecting the calling line to the register, but not used for a complete connection.

According to another subsidiary feature of the invention a registering device in response to a control from a calling line that selector switches of more than two stages are required for setting up a connection is adapted to take into use a single idle auxiliary control device, which if the number of selector switches in a given connection so requires is in turn adapted to take into use a further idle single control device and so on, which auxiliary control device or devices responds to other controls from the calling line identifying further the connection required, whereupon the register device jointly with the auxiliary control devices taken into use control test circuits to ascertain from which finder selector link serving the group of lines including the line from which the call is initiated switches accessible thereto and capable of setting up the desired connection are available thereby signifying the route over which the connection is to be set up. The register device is adapted in response to the selection of an available route to complete operating circuits for the switches in the selected route to set up the desired connection. If however the called subscriber is busy, a registering device causes the calling subscriber to be signalled and released without affecting the testing of selector switches over which the call could have been set up to the called subscriber.

According to a further subsidiary feature of the invention a cyclical generator is provided adapted to supply control impulses at distinctive phases of a cycle respectively to each finder selector link of a series together with the finder and selector switches respectively connected thereto or to which such finder-selector links have access, so that an impulse is provided at the same phase of a cycle to both the finder selector link of each series serving a group of said first set of lines and all switches accessible thereto which constitute a route. Conveniently the control impulses so generated by the cyclical generator are used for testing purposes and are applied respectively to test circuits associated with switches accessible to a selected finder selector link associated with each group of lines of said first set, impulses being made available or not for testing purposes in dependence upon whether the switch with which the respective test circuit is associated, is idle or busy. The same phase of a cycle that is used for testing purposes may also be used for operating switching devices in certain stages of the selected route.

The invention will be better understood by referring to the accompanying drawings which illustrate by way of example only one way of carrying the invention into effect in which:

Figure 1 illustrates the equipment of the various routes which can be taken into use by any subscriber or subscribers of a group of $A^2$ lines (e. g. 100).

Figure 2 illustrates equipment of the various routes which can be taken into use from an incoming junction line.

Figure 3 illustrates the equipment associated with a particular route indicating the various groups of lines, local and junction, which have access to the equipment of a single route.

Figures 4–20 illustrate the equipment required to set up a call over a single route.

Figure 4 illustrates a first-stage-finder forming part of a finder-final allocated to the said route as a finder and another route as a final selector together with the subscriber's line equipment.

Figure 5 illustrates a second-stage-finder of said route and means for giving a busy signal from equipment associated therewith.

Figure 6 illustrates an exchange digit selector of said route permanently associated with the second-stage-finder, a junction hunter of said route and a junction repeater together with battery feed and ringing equipment for local calls which are associated with a first digit selector of said route.

Figure 7 illustrates two first and second digit numerical selectors of said routes.

Figure 8 illustrates a third digit numerical selector and a second-stage-finder of said route having access to the same finder-final.

Figure 9 illustrates a finder-final acting as a fourth numerical or final selector of the said route and as a finder of another route.

Figures 10 and 11 illustrate an impulse responder including an impulse responder finder, route selecting means, impulse steering switches, impulse control relays, second-stage-finder and fourth digit responder individual to a particular group of calling lines.

Figure 12 shows an exchange digit responder together with hunting means for an idle dial repeater for inter-office calls and hunting means for an idle first-digit responder for local calls.

Figure 13 illustrates a first digit responder with hunting means for selecting an idle second digit responder.

Figure 14 illustrates a second digit responder with hunting means for selecting an idle third digit responder.

Figure 15 illustrates a third digit responder.

Figure 16 illustrates a junction finder and the equipment individual to an incoming junction line.

Figure 17 illustrates a battery feed equipment and the first digit selector associated with the junction finder.

Figures 18 and 19 illustrate an impulse responder finder adapted to be taken into use for an incoming call together with a fourth digit responder.

Figure 20 illustrates a first digit responder for incoming calls.

Figure 22 illustrates the arrangement of figures to illustrate the setting up of a call originated locally and Figure 23 illustrates arrangement of figures to illustrate the setting up of a call originating in a distant exchange. To facilitate the understanding of the scope of the expressions used herein, reference should be made to the detailed description and in particular to the explanatory matter following the description of Figs. 1, 2 and 3 hereof.

Figure 1:
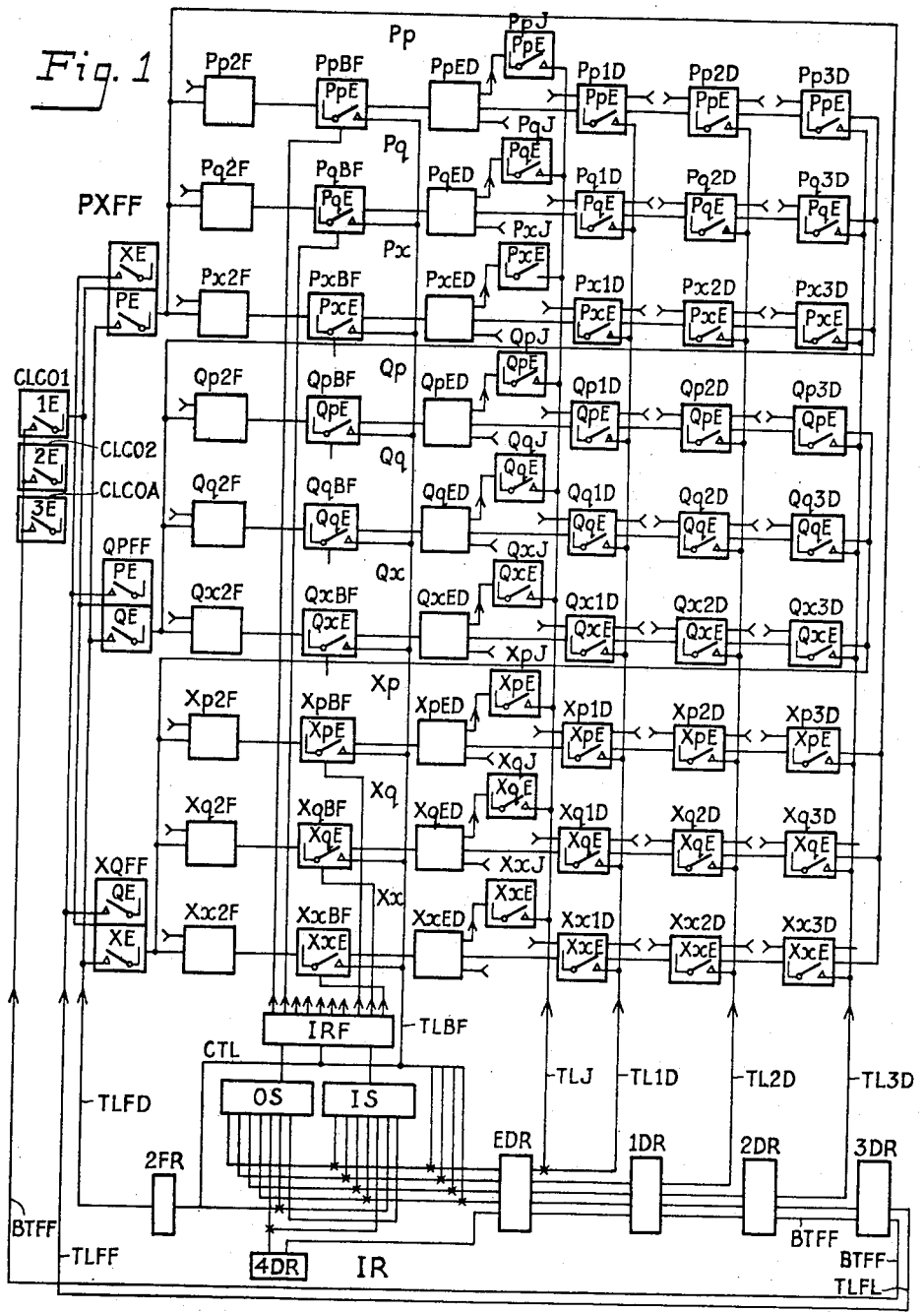
Figures 1–3 illustrate in schematic form the equipment required for an exchange.
Figure 2:
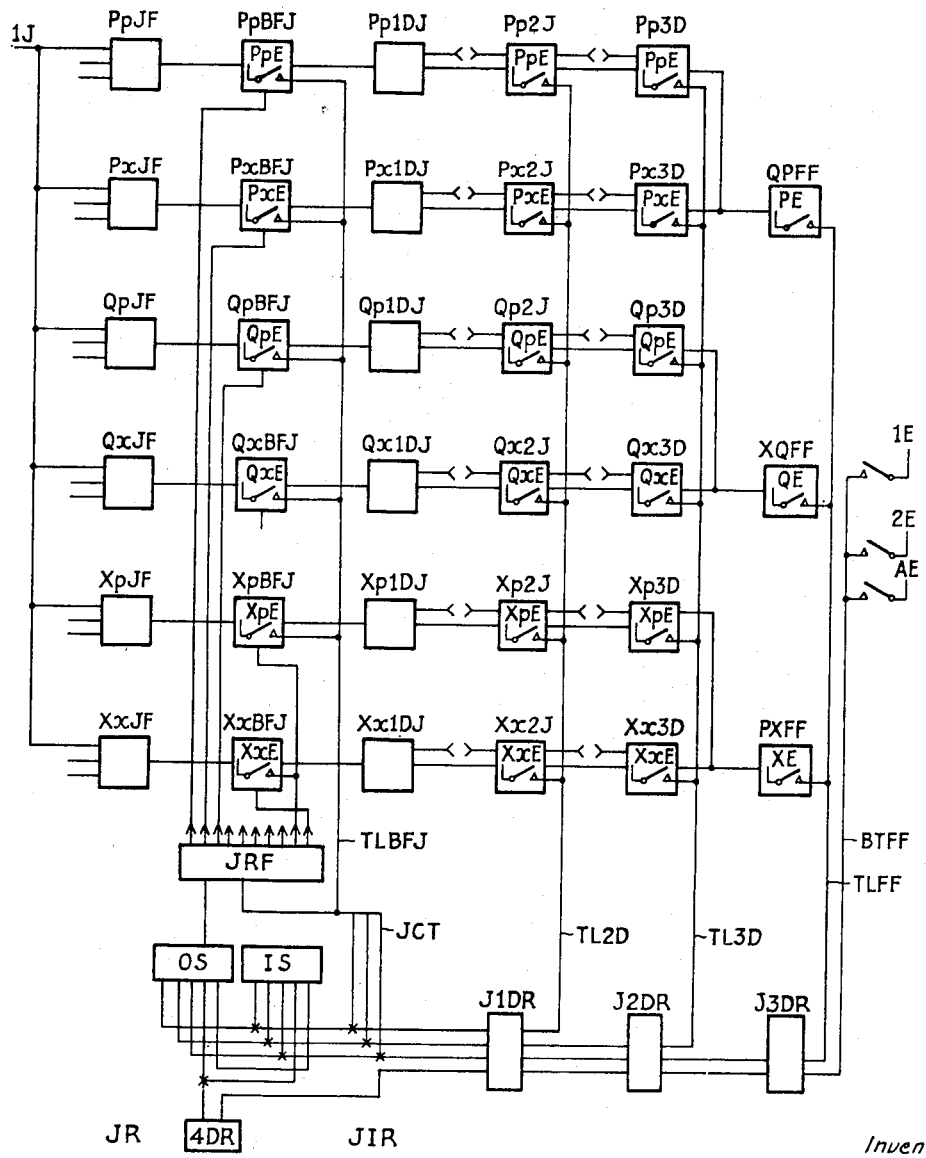
Figure 3:
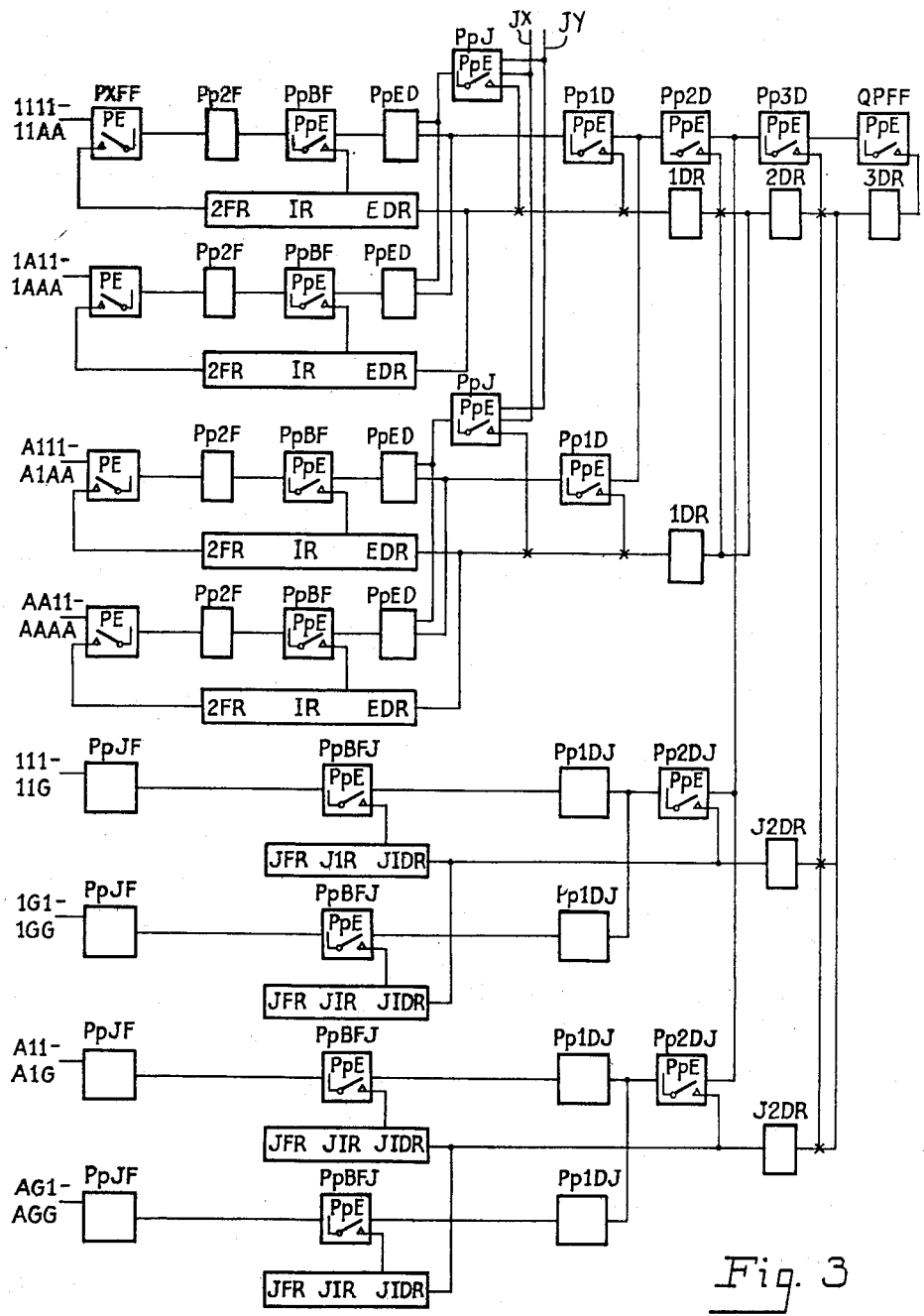

The general layout of an automatic telephone system for an exchange in a multi-exchange area will be appreciated from a study of Figures 1, 2 and 3. The exchange illustrated is assumed to have a capacity of $A^4$ lines, e. g. 10,000 and to form part of an area of A exchanges (e. g. 10).

These figures illustrate the component equipments by rectangles, details of such equipments and their electrical circuits being described hereinafter and separately illustrated in other figures.

The expression "selector switch" as used herein is intended to refer to a switching device which is set in accordance with one of the digits of the called line, whether exchange selecting digits or numerical digits, and applies also to translated digits where certain of the digits stored in the register in accordance with the directory number of a subscriber are translated into routing digits having only an arbitrary relationship to the digits stored. Figure 1 illustrates the equipment of the various routes local to the exchange in which a call originates which equipment may be involved in a connection originating from any line of a group of $A^2$, e. g. 100) lines connected to said exchange.

Figure 2 illustrates the equipment of the various routes in an exchange to which a call is extended over a selected group of junction lines incoming to said exchange.

Figure 3 illustrates the exchange equipment involved in a single route such that if the switching devices required for setting up a connection to a particular destination are idle a connection can be set up over the route to which the switching devices belong in the originating exchange either from any line in such exchange or from any junction line incoming to said exchange and to either an idle junction leading to any other exchange in the area or to another line in the same exchange.

Referring to Fig. 1 the routes are represented by the references P$p$, P$q$, P$x$, Q$p$, Q$q$, Q$x$, X$p$, X$q$, X$x$ and each route includes a number of components, the references thereto having prefixes corresponding to the route reference and followed by the references distinctive of the particular components such as BF which generally refers to busy tone feeding equipment, but may in certain circumstances include battery feed equipment, exchange digit selector ED, first digit selector 1D, junction selector J, second digit selector 2D, third digit selector 3D and a second stage finder 2F. The first stage finder is combined with a fourth or final digit selector and the combination is given the reference FF and will hereinafter be referred to as "finder final." As the traffic for the number of lines for which the finder final is designed is small, the number required is very much less than the number of routes and for this reason it is convenient to multiple a number of routes together. The finder final, in the example considered, is assumed to be common to those routes having the same prefix and has this prefix included in its reference. As each route must necessarily involve two different finder finals which conveniently are both common to the routes P$p$, P$q$, P$x$, the prefix P is included in the reference to both these finder finals. The two finder finals of a route must of course be different, as it is impossible for the same switching device to be used as a finder and final of the same route, seeing that this would prevent connections being set up between subscribers to which a particular finder final has access. Hence the combined outlets from the third digit selectors of the routes which choose the same finder final has access to a final digit selector which is combined with a finder belonging to another set of routes.

To illustrate this in a convenient form a finder final in addition to the suffix FF is preceded by two letters the first one indicating the route with which it is associated as a finder, and the second for indicating the route with which it is associated as a fourth digit or final selector.

For instance as illustrated, the third digit selectors 3D of the routes P$p$, P$q$, P$x$ have access in common to the finder final QPFF with the first prefix reference Q, those of Q$p$, Q$q$, Q$x$ to the finder final XQFF with the first prefix reference X and those of X$p$, X$q$, X$x$ to the finder final PXFF with the first prefix reference P.

It should be understood that it is not essential that every finder final should be the combined outlet of the same number of routes. Again it is not essential that finders and final selectors should be combined in which case the finders and finals might be individual to the same set of routes. In fact so many rearrangements are possible that the drawing must simply be taken as indicating an arrangement which while particularly convenient for the purposes of illustration, and having conveniences which may commend it in practice if traffic conditions are suitable, is not intended in any way to restrict the scope of the invention claimed. Similarly just as finder finals may be made common to a number of routes in view of the light traffic they carry, so third digit and other selectors may be made common to two or more routes if the traffic is sufficiently light, in which case separate contacts corresponding to each such route may be provided in connection with each such selector for marking the common conductor.

It should also be understood that the references P, Q, X, which represent groups of routes P$p$, P$q$, P$x$; Q$p$, Q$q$, Q$x$ and X$p$, X$q$, X$x$, respectively multipled to finder-finals PXFF, QPFF, XQFF respectively are intended to represent a general case of which three only are illustrated; for instance it may be desirable to have four or five finder-finals to a ten line group and three or four times as many routes. Each finder-final such as PXFF, QPFF, XQFF has access to A lines, of which CICO1, CICO2, CLCOA represent the lines and cut off relays.

Conveniently but not essentially, the battery feeding equipment is located individual to the junction repeaters and individual to the first digit selectors respectively, while busy-feed equipment B$f$ is located between the second stage finder 2F and the exchange digit selector ED so that these three units are permanently connected together. The battery feeding equipment conveniently includes relay, through the windings of which battery is fed to the calling line and towards the called line, ringing relays, and associated equipment which is more particularly described hereinafter. The busy feed equipment enables busy tone to be fed to the calling subscriber until he hangs up with the minimum of equipment in use.

The second stage finder 2F of each route has access to A finder finals (where A may equal 10 if the decimal system is used for the switching devices used in setting up connections) and each finder final has access to A lines so that second stage finders and exchange selectors are provided in groups according to the number of routes and in common to $A^2$ lines. This is convenient for the purpose of illustrating the invention in as simple a form as possible and might well prove advantageous under certain practical conditions. As, however, conditions vary considerably it may be found desirable to reduce the number of exchange selectors by making them available to say $2A^2$ or $3A^2$ lines with consequent modifications, such as a larger second stage finder or an additional finder stage which those skilled in the art will be readily able to devise from the description herewith.

The exchange digit selector ED in common with other exchange digit selectors of the same or other routes has access to a number of junction selectors J for each exchange which is directly connected with the calling exchange, and to a first digit selector 1D for calls to lines connected to the calling exchange. The junction selectors J are provided for the purpose of making more efficient use of junction lines as it is assumed that these will be of such a cost as to justify the provision of this additional equipment. If the cost of providing junction lines is negligible, such as where two exchanges are very near together or where an excess of junction lines between two exchanges has become available, it may prove more convenient to eliminate the junction selectors and connect a junction line to corresponding outlets of each exchange digit selector of each route.

Conveniently the junction selector J is designed to select an idle junction line of a small group and to consist of a number of relays, so as to have more than one junction line accessible from each route, it also may enable certain junction lines to be accessible in common from a number of different routes as described in my copending application Serial No. 226,134 of even date, now abandoned.

The first and second and third digit selectors 1D, 2D, 3D are connected in tandem and are made available in common to increasingly larger groups of calling subscribers' lines including lines connected to other exchanges, as the number of such selectors accessible to a particular group of calling lines grows. The finder finals FF are of course available for use for any call wherever originated.

It is assumed that all the digit selectors and finder finals have a capacity of A lines which on a decimal system would be 10, but the capacities of each selector need not necessarily be the same.

Associated with the equipment available to a given group of calling lines (A² as illustrated) there are a number of impulse responding equipments 1R, of which one only is shown. An idle one of these equipments is adapted to be taken into use on the origination of a call over an idle finder FF, an idle second stage finder 2F and over an idle impulse responder finder 1RF.

Each impulse responding equipment comprises in addition to the impulse responder finder 1RF, an exchange digit responder EDR, a first digit responder 1DR, a second digit responder 2DR, a third digit responder 3DR which are selected and taken into use in the case of local calls to respond to the first, second and third numerical digits, a fourth digit responder 4DR, a second stage finder responder 2FR, and an incoming impulse steering switching device IS and other subsidiary equipment OS. It will be understood that 1DR, 2DR, 3DR in order are each available in common to increasingly larger numbers of impulse responding equipments, such as IR, and therefore only form part of IR during the setting up of a particular connection dependent upon it being local to the exchange and the values of the first and second numerical digits. The arrangement is such that the incoming steering switch 1S in turn directs the impulses received from a calling party to EDR, 1DR, 2DR, 3DR and 4DR. 3DR connects up a lead BTFF corresponding to the finder final selected to which lead potentials are applied at instants of the cycle corresponding to those lines of the A lines to which the finder has access if such lines are busy. If the particular line representing the wanted subscriber in said group of A lines is busy then a connection made by 4DR in accordance with the fourth digit is caused jointly with impulses transmitted back from 3DR over lead BTFF to cause a relay (not shown) to be operated in equipment 1R which in turn causes a relay to be operated in the BF equipment selected by a calling line which results in the release of 1R and equipment controlled thereby and in a busy signal being given until the calling subscriber hangs up direct from the BF equipment over the switching devices 2F and FF used in initiating a call from the calling subscriber. If the called line is free, then the equipment 1RF is again operated over a common test lead CTL to which potential is connected up to indicate which of the routes Pp—Xx are not available. As a refinement, provision might be made in equipment 1R to prevent selectors FF and 2FF by which a calling line was connected to 1R, being indicated as busy. The route selected therefore depends upon the idle or busy condition of a finder-final when serving as a finder, a busy feed equipment, with second stage finder and exchange digit selector, a first digit selector, a second digit selector, a third digit selector and a finder final serving as a fourth digit selector. The idle or busy conditions of these devices in the various routes required to set up a given connection are indicated on test leads to common test lead CTL as follows: as regards the first stage finders (finder-final) over the lead TLFFC (first stage finder test lead) which is selected by the second stage finder 2FR operated over an identifying lead associated with the calling line connection through IRF: as regards the first digit selectors over TL1D, as regards the second digit selector over TL2D, as regards the third digit selectors over TL3D, as regards the fourth digit selectors (finder finals) over TLFF, and as regards the busy feed equipments BF including therewith second stage finders 2F and exchange digit selectors over TLBF. Having discovered an idle route, for instance in the manner described hereinafter, the IRF operates to establish connection between IR and the BF equipment of the selected route and thereupon either control is exerted digit by digit (i. e. from EDR for the exchange digit, from 1DR for the first digit, from 2DR for the second digit, from 3DR for the third digit and from 4DR for the fourth digit) or preferably a switching operation takes place simultaneously over each of the selectors ExD, 1D, 2D, 3D from the respective responders EDR, 1DR, 2DR and 3DR which have access to the relays of the selectors which require to be operated. Selector 4D can then be operated under control of 4DR over the connection thus established. Connection is therefore established to the called line. The identifying leads for the penultimate and final digits of the calling number are arranged if necessary to control the setting of the second stage finder 2F and of the finder final (functioning as a first stage finder of the selected route) to the calling line. Immediately this is effected the function of 1R and its associated equipment is completed and equipment taken into use from it is released as also the finder final and the second stage finder which were originally used in setting up a call if these do not belong to the route selected. The connection between the calling and called line is thus completed and the release of all the equipments is controlled from the battery feed equipment associated with the first digit selector so that when a calling subscriber hangs up all the operated switching devices in the route are released.

In the foregoing description it has been assumed that a local call has been set up. If, however, the called line should be located in another exchange than the calling line, instead of the exchange digit responder connecting up test lead TL1D it will connect up to a junction test lead TLJ corresponding to the exchange selected by EDR. In this case the selection of an idle route by 1RF from CTL will be wholly dependent upon TLJ, TLFF and TLBF. Having determined the route, the exchange digit will be transmitted under control of EDR to operate the exchange digit selector ED or possibly the appropriate relay in ED of the selected route operated direct from EDR and thereby set the BF equipment into connection with an idle junction leading to the exchange required. 1R in a suitable manner dependent upon the nature of equipment in the called exchange, will then control the setting up of the connection in the selected exchange and will then be released. For instance, the numerical digits may be stored on a dial repeater whereby, when the equipment in the wanted exchange is seized series of impulses identifying the wanted line and in a form corresponding to that required for operating the equipment in the wanted exchange may be transmitted and in this way it is immaterial whether the called exchange is of the same type as the calling exchange or is of any other type which operates under control of incoming series of impulses.

The next equipment to be described is that required for calls incoming from a distant exchange. In this case the nature of equipment in the other exchanges is important.

The equipment will be different if the distant exchange operates step-by-step by series of impulses or operates for instance by selected impulses in a cycle, that is to say, according as to whether the distant exchange is different from or the same as the exchange working in accordance with the arrangement shown in Fig. 1. In either case the equipment can be represented by rectangles, but there will be certain modifications in the details of particular equipments in accordance with the nature of the interexchange call.

Fig. 2 illustrates the equipment available to a small group of junctions of which 1J is shown, which group corresponds to the capacity of a junction finder JF which serves to connect a busy feed equipment BFJ to a calling incoming junction line 1J. The same routes are available for incoming junction calls as for calls originating in the exchange, but in the drawing only the routes Pp, Px, Qp, Qx, Xp and Xx are illustrated. Each route embodies busy feed equipment BFJ with which a first digit selector 1DJ and a finder switch JF are permanently associated, second digit selectors 2D accessible from 1D, third selectors 3D accessible from 2D and finder finals FF accessible from third selectors 3D, it being assumed that the third selectors and finder finals are available in common to local and incoming calls.

The equipment including the reference J would in general perform similar functions to that having the same reference without the J irrespective of the nature of the equipment in the distant exchange, while the selector switches 2D, 3D and FF may be identical with those represented in Figure 1. A number of junction impulse responders JIR are provided in common to the group of junctions of which 1J is representative. JIR consists of a responder finder JRF, an incoming-impulse steering switch IS and other subsidiary equipment OS, a first digit responder J1DR and a fourth digit responder 4DR. While 2nd and 3rd digit responders are taken into use in a similar way to that described with reference to the taking into use of 1st, 2nd and 3rd digit responders for a local call.

If the distant exchange is of the kind which transmits successive series of impulses for control of the setting up of connections to distant exchanges, then the first digit responder 1DR and the fourth digit responder 4DR, as well as the second digit responder 2DR to which 1DR has access and the third digit responder 3DR to which 2DR has access, would be of similar general arrangement to that illustrated in Fig. 1. If, however, the distant exchange exerts control by sending impulses at selected instants in a cycle, then the digit responders must be constructed so as to respond to such cyclic impulses so that they will be operated similarly to the digit selectors. In other cases some method of adapting the control for the distant exchange will be required.

On a call incoming from 1J an idle junction finder JF is operated to connect with such line and in turn to initiate the operation of an idle junction responder finder JRF so as to associate an idle junction responder JR with the incoming line 1J. The control from the distant exchange is then received and rendered available by 1S in turn for each digit to control respectively the operation of the digit responders 1DR, 2DR, 3DR and 4DR. A test is then made as described in connection with Fig. 1 to ascertain whether the called line is busy or not. If the called line is busy a busy signal is transmitted back over the junction line TJ to the calling station and eventually the whole of the equipment is released when the calling party hangs up. If, however, the called line is idle then the leads TLBFJ, TL2D, TL3D and TLFF are rendered effective to apply to JCT cyclic impulses from the various routes to indicate which of the routes is not available for setting up a required connection from the particular junction 1J to the particular called line. In accordance with the potentials thereby fed to JCT, JRF is again operated to establish connection with a route which is available for setting up a desired call and thereupon control is exerted in either of the manners previously described by 1DR, 2DR, 3DR and 4DR on the selectors 1D, 2D, 3D and FF respectively to establish connection with a called line. When such connection is established the battery feed equipment is made available to the called line. The calling line as usual is supplied with battery from its own exchange, e. g. from a repeater connected to the outgoing end of the junction line. The called subscriber's telephone is run and the equipment JR releases together, if still in use, with the equipment which has been in use for establishing the connection on the initiation of a call over the junctions 1J.

It will be appreciated that the JR equipment described corresponds to that associated with a terminating exchange. In the case of a tandem exchange the JR equipment will also resemble that of 1R particularly if series of impulses are transmitted between exchanges rather than selected impulses in a cycle.

Referring to Fig. 3 this figure illustrates representative equipment involved in a single route from which (in conjunction with Figs. 1 and 2) the whole of the equipment in an exchange can be readily deduced. By way of example, the route Pp is illustrated. In this figure it is assumed that for every $A^2$ (e. g. 100) lines in an exchange there is provided in each route equipment comprising busy feed equipment BF coupled with a second stage finder 2F and an exchange digit selector ED. In addition there is provided common to a number of routes Pp, Pq, Px, a finder final PXFF acting as a finder switch. There is also shown an impulse responder 1R having associated with it the equipment described with relation to Fig. 1 and including inter alia a second stage finder responder 2FR and an exchange digit responder EDR. The equipment 1R however is common to all the routes provided and is linked individually to a group of $A^2$ (e. g. 100) calling lines.

As the exchange digit selector and the exchange digit responder are adapted to respond to A (e. g. 10 impulses) it is clear that their outlets may be made available to a larger group of subscribers' lines than $A^2$. By way of example, but not by way of limitation, it is assumed that the junction selector PpJ and the first digit selectors PL1D are available to a group of $A^3$ (e. g. 1,000) calling lines. For convenience only the first and last group of lines of $A^3$ lines are indicated in Fig. 3, namely 1111—1AAA and A111 to AAAA, and it will be noted that the corresponding outlets from ED available from the $A^2$ group of lines 1111—11AA and those available from the $A^2$ lines 1A11—1AAA as well as those available from all intermediate groups of $A^2$ lines are multipled together both to junction selector PpJ and to first digit selector Pp1D. Similarly the corresponding outlets of the exchange digit responders EDR of the impulse responders 1R for the various $A^2$ (e. g. 100) line groups of the $A^3$ line A111 to AAAA are also multipled together.

It will be appreciated that the first digit selector PpD which also has A (e. g. 10) outlets can have its outlets available to a still larger group of lines. In this case the capacity of the whole exchange, that is of the whole $A^4$ (e. g. 10,000) lines. This is illustrated in Fig. 3 by representing the first and last 100 line group of the last $A^3$ (e. g. 1,000) lines, which outlets from the first-digit selectors Pp1D are multipled in common to the same second-digit selectors Pp2D. Similarly the corresponding outlets of the first-digit responders 1DR which inter alia determine the idle and busy condition of the second-digit selectors corresponding to the first numerical digit are multipled together as shown. The third digit selectors 3D and the finder finals QP and QF1, which are allocated to the route Pp illustrated are in common with other routes, common to the calling lines of the whole exchange.

As incoming junctions from the other exchanges in the network also make use of the same routes, some of the equipment illustrated in Fig. 3 is exclusively reserved for junction line working while other of the equipment may be used in common for incoming and local calls. The exclusive junction equipment consists of busy feed equipments PpBFJ with which are permanently associated a junction finder PpJF and a junction first-digit selector, PpJ1D while common to the various routes is provided a junction impulse responder J1R comprising inter alia a first digit responder 1DR and a junction finder responder JFR.

This is the equipment which is necessarily used exclusively for incoming junction calls but if the control exerted over the incoming junction lines is different from that exerted over a calling line, then the digit responders 1DR, 2DR, 3DR, 4DR should be adapted accordingly and would also be assigned exclusively for junction line working.

For convenience, but solely by way of example, it has been assumed that there are a group of $FG^2$ junctions incoming from each exchange and that a junction finder JF has access to G junctions. It is also assumed that there are A exchanges in the network and by way of example the first and final sub-groups from exchange 1 and from exchange A are represented, namely 111—11G and 1G1—1GG to represent the $G^2$ group from exchange 1 and A11—A1G and AG1—AGG to represent the first and last groups of the G² junctions from exchange A. Corresponding outlets of first digit selectors P*p*J1D accessible from exchange 1 are multipled together. Similarly the junction first-digit selectors P*p*J1D accessible from exchange A have their corresponding outlets multipled together. This however is not essential as multipling could be done between corresponding outlets from groups from different exchanges or even outlets from first digit selectors of the local exchange. The second digit selector shown is referred to as P*p*J2D simply because it is definitely associated with junction line working although it is of the same design as selector 2D and has nothing distinctive of junction line working other than in the arrangement shown.

The corresponding outlets from the second digit selectors P*p*J2D associated with all the junction lines from all the exchanges may be multipled together with the second digit selectors P*p*2D so that the third digit selectors and that portion of finder finals which corresponds to the fourth digit are common to all the calling lines of the network.

The second digit responders J2DR accessible from J1R, if responsive to the same kind of control, would be similar to the second digit responders 2DR accessible from 1R and their outlets could be multipled together as shown so that the third digit responder is common to the whole network. If the control is different then separate third digit responders 3DR would also require to be provided.

The arrangement illustrated is only an example of what can be done because it will be appreciated that while there is for each route one first digit selector for each A² calling lines there are A second digit selectors available to A³ lines and there are A² second digit selectors available to A⁴ lines and A³ finder finals FF functioning as final digit selectors available to A⁵ lines.

The loading of the routes depends of course upon not only the amount of traffic but also upon the origin and destination of the traffic and a single route P*p* as illustrated in Fig. 3 can carry as many as A² calls terminating in the exchange and A² outgoing calls and while allowance has to be made for calls having to be dealt with by alternative routes because origin and destination are such as to clash with that of existing calls already set up, it is very unlikely that the same clash will take place for each route so that quite a large percentage of the available calls on each route can be taken up.

Having regard to the small capacity of each selector used it is possible to allow for rather more routes than would normally be allowed for in the known methods of trunking, without approaching the number of switching points required for all the selectors of the exchange. The junction outlets from P*p*J of the calling exchange accessible from lines 1111—AAAA are shown multipled together. This should be understood to be purely conventional and actually the connection of the junctions lends itself to many variations so that, for instance, some junctions may be individual to each outlet or to the corresponding outlets of a limited number of selectors J while others are available in common to a larger number of selectors J or again as the number of outlets J is intended to be small for each route then these outlets may be multipled as thought desirable with the outlets from other routes.

By referring to Figs. 1, 2 and 3 it will be noted that the lines to be interconnected may be divided into two sets, one of which sets may include lines incoming from subscribers' stations alone or together with lines incoming from other exchanges while the other set may include lines outgoing to subscribers' stations alone or together with lines outgoing to other exchanges, it being understood that the lines incoming and outgoing to subscribers' stations correspond, while unless junction lines are arranged to be two-way the interexchange lines in the two sets are different.

Lines which may serve as incoming lines whether from subscribers' stations or from other exchanges are divided into A² groups as regards the lines from subscribers' stations and AG groups as regards lines from other exchanges. Accessible to each group are a series of finder-selector links P*p*BF—X*x*BF (Fig. 1) for lines incoming from subscribers' stations and P*p*BFJ—X*x*BFJ (Fig. 2) for lines incoming from other exchanges. Access from a finder-selector link to a group of incoming lines is effected over one or more stages of finder switches, e. g. two (primary and secondary finder switches) in the case of incoming calls from subscribers' stations and one stage in the case of calls incoming from other exchanges. Each such link accessible to a group of incoming lines may be described as having a different route significance to which the references P*p*—X*x* are applied, while each outlet of each finder switch has a different numerical significance, corresponding to the line or particular number of lines of the group to which it gives access, so that there is only access corresponding to a single route significance from each link through finder switches leading towards a particular group of incoming lines. On the other hand in accordance with the invention selected finder selector links, such as the various links having the same route significance and referred to, as P*p*BF or P*p*BFJ, in Fig. 3, each have access over finder switches P*p*2F, to a different group of said first set of lines, such as the groups of lines 1111—11AA, 1A11—1AAA, A111—A1AA, AA11—AAAA, 111—LLG, 1G1—1GG, A11—A1G, AG1—AGG. Consequently there will be a finder switch or switches serving each such different group of said first set of lines which are connected or accessible from a finder-selector link which will have the same route significance as the link to which it is connected or which has access to it. Each finder-selector link moreover has access over selector switches to any one of said second set of lines. Each outlet of a selector switch also has a different numerical significance so that there is only one means of access to a particular line from any link, the selector switches giving access to subscribers' lines being arranged as shown in five stages, such as P*p*ED, P*p*1D, P*p*2D, P*p*3D, QPFF to give access to A⁴ local lines from local lines and in four stages P*p*1DJ, P*p*2DJ, P*p*3DJ, QPFF to give access to A⁴ local lines from lines incoming from other exchanges, while the selector switches giving access to lines outgoing to other exchanges may be arranged in one or more stages, such as P*p*ED, only one stage being required if there is only one exchange selecting digit as in the arrangement illustrated in Figs. 1 and 3. Corresponding outlets (i. e. those having the same numerical significance) of a selected number, e. g. A, of selected first stage selector switches P*p*ED, P*p*1DJ connected to links having the same route significance of each of a number of series of links allocated to different groups of lines of said first set e. g. 1111—11AA, 1A11—1AAA, or A111, A1AA, AA11, AAAA, or 111—11G, 1G1—1GG, or A11—A1G, AG1—AGG are multipled together and connected to a second stage selector P*p*1D or P*p*1DJ, while selected corresponding outlets of a selected number of selected second stage selector switches P*p*1D, P*p*2DJ, i. e., outlets having a similar numerical significance are also multipled together, thereby giving them the same route as the links of the respective series which give access to them. In other words the various selector links of the different series which have access to different groups of lines of said first set and have outlets of the selector switches to which they give access multipled together, all have the same route significance. Outlets of P*p*1D are common to the links serving all the groups 1111—AAAA. Outlets of P*p*2DJ and P*p*2D are common to all the groups 1111—AAAA and 111—AGG.

The total number of route significances throughout the exchange is therefore at no time greater than the maximum number of finder-selector links in a series which gives access to a group (e. g. A²) of said first set of lines, that is to say the total number of route significances throughout the exchange can be represented by the references P*p*—X*x*. Furthermore finder-final switches which serve either as finders or last stage selectors, the traffic over which is comparatively light in that they only give access to a restricted number of lines, e. g. A lines, may have more than one route significance if the density of traffic to such lines permits. For instance PXFF has the route significances P*p*, P*q*, P*x*, when acting as a last stage selector. It will thus be seen that each switch in the exchange has both a numerical and route significance which is distinctive for that switch, the route significance being derived from the finder-selector link or links which have access to it. The numerical significance of a primary finder switch is indicative of the group of A incoming lines to which it gives access, the numerical significance of the secondary finder switch being indicative of the group of $A^2$ incoming lines to which it gives access, while the numerical significance of a selector switch depends upon the stage in which it is located; in the last stage it is indicative of the outgoing group of lines to which it gives access; in the first stage it is indicative for each succeeding stage of a diminishing number of groups of outgoing lines to which it gives access and to an increasing number of groups of incoming lines which it gives access to.

The whole of the switches in an exchange having the same route significance are herein referred to as a route which may be conveniently given the same reference as the route significance of the switches comprising the route, so that a route represents the switching means provided to enable a single connection to be set up between any line of the said first set of lines to any line of said second set.

Figure 21:
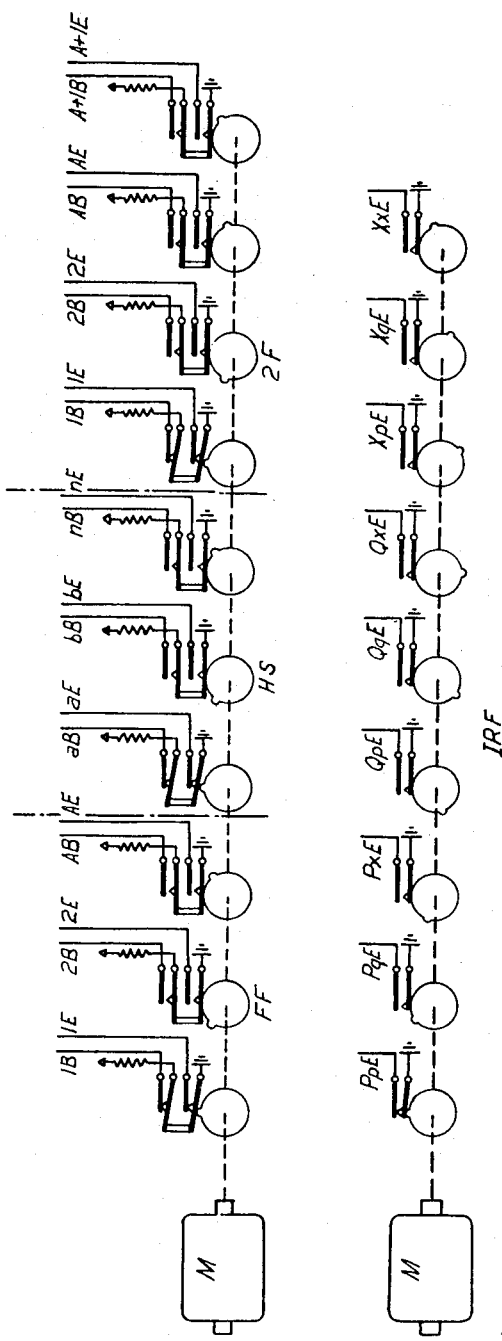
Figure 21 illustrates a method of generating cyclic impulses suitable for the various operations described in connection with Figures 4–20.

Fig. 21 shows a number of cyclic impulse generators such as are suitable for use in conjunction with the equipment described with reference to Figs. 1–20.

For the control of finder finals the cams FF comprising discs with staggered projections are used, mounted on a shaft driven by a motor M and in which three instants only in a cycle are represented, 1, 2, and A. If the capacity of the finder final is 10, then 10 cams would be provided spaced round the periphery of the discs. It will be noted that the left hand cam of FF is shown operating the contact springs associated therewith so that lead 1B is connected to battery through a guarding resistance and lead 1E is connected to earth. The instant this takes place is referred to herein as instant 1 in the cycle. The middle cam which would be operated at the next instant in the cycle namely instant 2 would at that instant connect battery through resistance to lead 2B and earth to lead 2E. Similarly at other instants in the cycle, so that at instant A battery is connected to lead AB and earth to lead AE. Preferably although not as shown the cams would be arranged equally spaced round the periphery of the discs at different angular positions so that there would be a minimum of waste time between the connection established at one instant, and those established at the next instant. These leads 1B, 1E, 2B, 2E, AB and AE are shown illustrated in Fig. 4 and Fig. 9. Additional contact springs may be provided, or the leads 1B, 1E, etc. might be connected through a number of rectifiers to various control points, as it is important that the same cycle and the same instant in the cycle should be used for all finder final equipment throughout the exchange or at any rate, for those which may be controlled by the same impulse responders.

The cams HS are provided for controlling various hunting circuits which are to be found in Figs. 4–20, while only one set of cams is shown it might well prove desirable for different sets of cams to be provided, because each hunting device may vary in capacity, that is to say the number of cams to be provided would be in accordance with the hunting operations in particular positions. It will be noted that by means of these cams, battery is connected to leads *a*B, *b*B, *n*B at instants *a*, *b*, and *n* respectively in a cycle while earth is connected to leads *a*E, *b*E, *n*E, also at instants *a*, *b*, *n*, in a cycle respectively. Referring to Figs. 4–20 it will be noted that these references *a*, *b*, *n*, apply to the junction hunter PPJ1 shown in Fig. 6, the dial repeater hunter JDRH shown in Fig. 12 and also in Fig. 12 to the first digit responder hunter 1DRH, in Fig. 13 to the second digit responder hunter 2DRH, in Fig. 14 to the third digit responder hunter 3DRH, in Fig. 16 to the junction finder P*p*JF and in Fig. 20 to the junction second digit responder hunter J2DRH. It will be appreciated that as the circumstances for these various hunting operations are quite distinctive, it would probably be convenient to have quite a number of sets of cams such as HS, dealing with each kind of hunting and possibly dealing with different hunting capacities for the same kind of hunting where the traffic requirements call for it. 2F indicates a set of cams suitable for operation of second-stage-finders. This is similar to those for the finder-final except that provision is made for one additional cam by which battery is placed on a lead (A+1)B at instant A+1 in a cycle and earth on lead A+1E at the same instant A+1 in a cycle. As will be noted from the description of the circuits in Figs. 4–20, the leads associated with 2F marked 1E, 1B, 2E, 2B, AE, AB are used for purposes of operating the second-stage-finder 2F while the leads A+1E, A+1B are used for breakdown and switch through purposes. This enables a single lead to be used for different purposes and so reduces the number of contacts required on the relays constituting the impulse responder finder.

The cams referred to as IRF are used for controlling the operation of the impulse responder finders IRF and for operating the various digit selectors other than the finder final. In this case there are no battery-connected leads but only earth-connected leads, earth being connected to lead P*p*E at instant P*p* in a cycle, to lead P*q*E at instant P*q* in a cycle and so on successively until earth is connected to lead X*x*E at instant X*x* in a cycle. This is followed immediately after by the connection of earth to lead P*p*E at the first instant P*p* of the next cycle. In view of the operations which have to be performed during the particular instant, it may be desirable that the motor driving the cams IRF should be operating at a less speed than the motor driving the cams FF, HS and 2F. The desired speed of the motor or motors will of course depend in the case of any of the sets of cams upon the operating time of the equipment controlled thereby, leaving a suitable margin in order to be sure that the operations controlled over the respective leads will be effective.

One or more of the leads P*p*E to P*x*E will be found in Figures 1–11, 17 and 18. The leads shown in these figures are not identical but all have the same characteristic that earth is applied there-to at an instant in a cycle represented by the prefix P*p*—X*n* in their reference. As previously mentioned each lead may be connected to the correspondingly named lead in Fig. 21 via a unidirectional resistor or its equivalent or separate contact devices may be operated by each cam for controlling the application of potential at the appropriate instants to the respective leads.

Fig. 22 shows how the drawings should be arranged for the purpose of an outgoing call or a local call as regards the operation of equipment individual to an exchange.

Fig. 23 shows how the figures should be arranged for an incoming call.

A description will now be given of the equipment required to set up a complete connection over a single route as regards the apparatus in a single exchange. The equipment described is that belonging to the route P*p* with a finder-final common to route P*p*, P*q*, P*x*, when acting as a first stage finder and the routes X*p*, X*q*, X*x*, when acting as a final or fourth digit selector and with a second finder final acting as a final selector for routes Pp, Pq, Px, and as a finder for routes Qp, Qq, Qx as will be appreciated by reference to Fig. 1.

Figure 4:
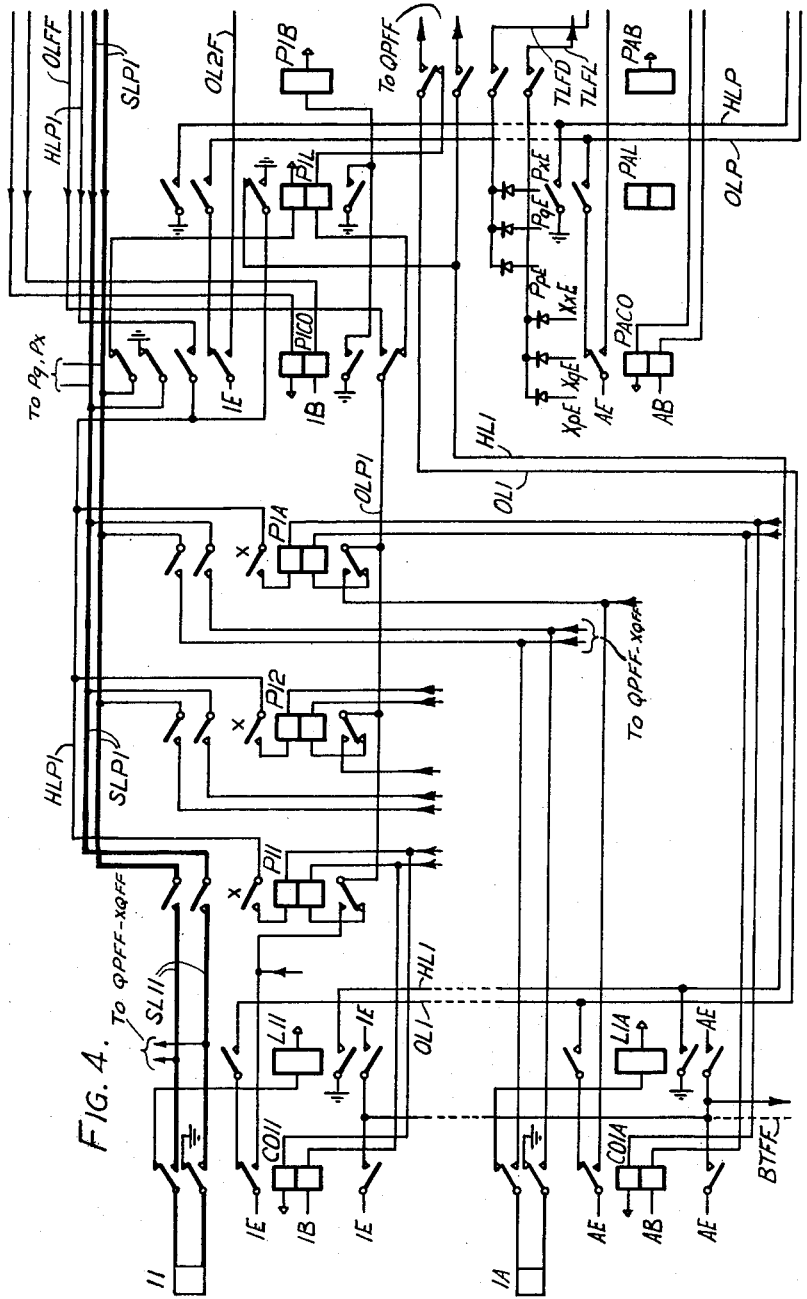

In Fig. 4—references 1B, 1E, 2B, 2E, AB, AE, indicate leads to which battery or earth (according as to whether the references include B or E) is connected at an instant in a cycle indicated by the prefixes 1, 2, A as described in connection with Fig. 21.

Figure 9:
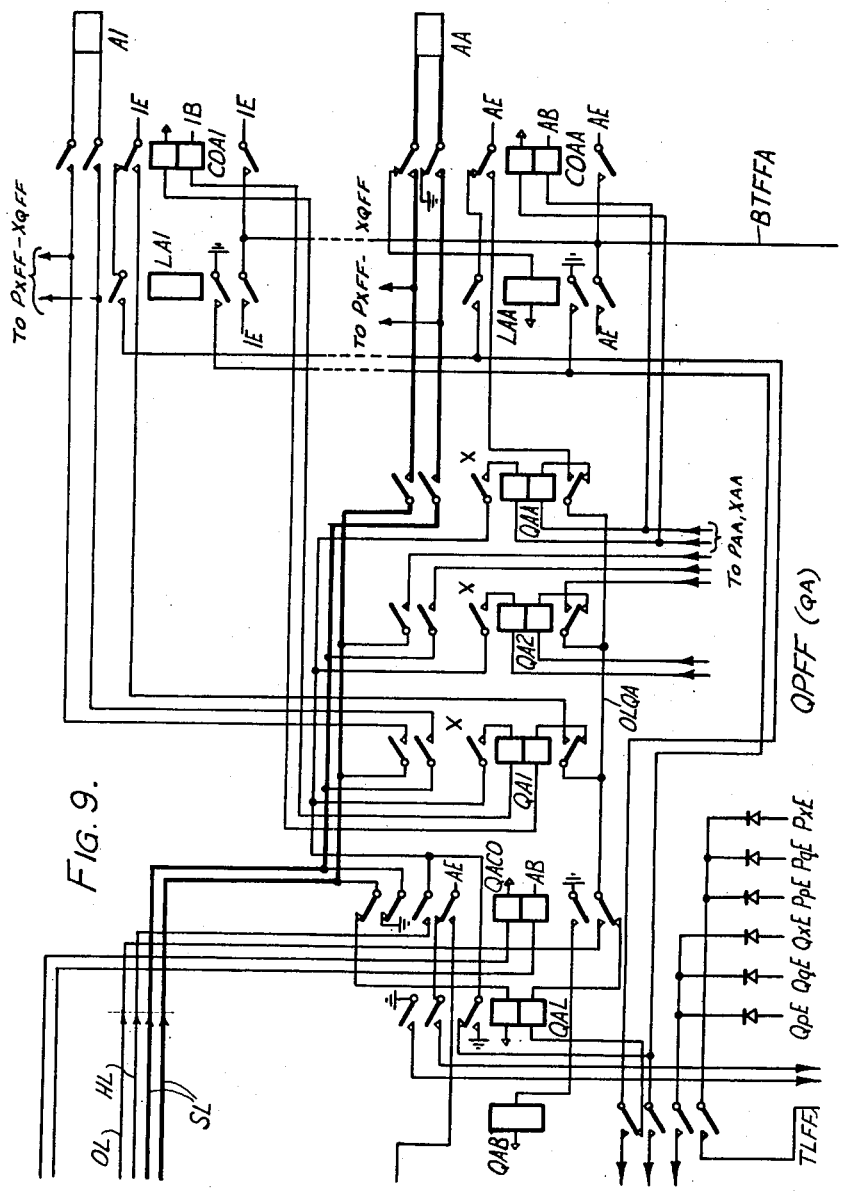
Figure 10:
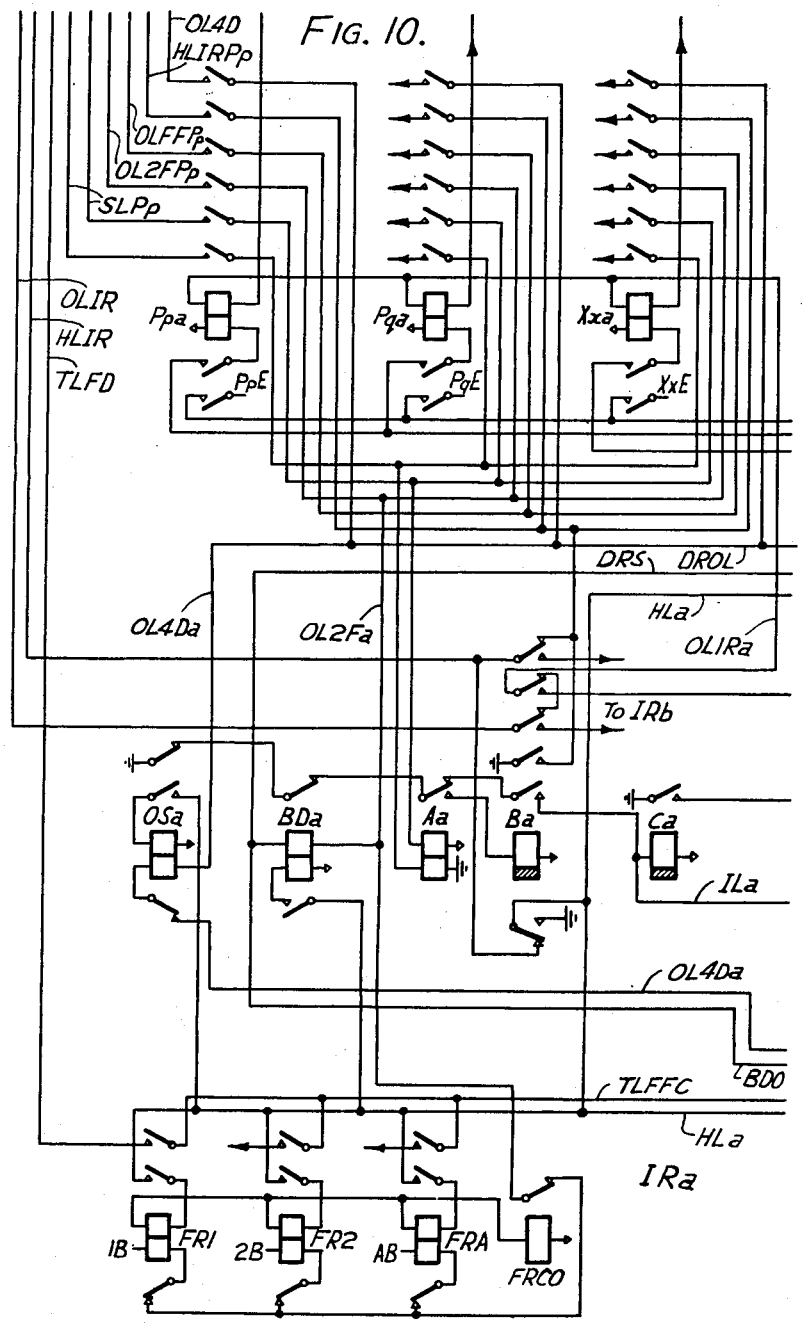
Figure 11:
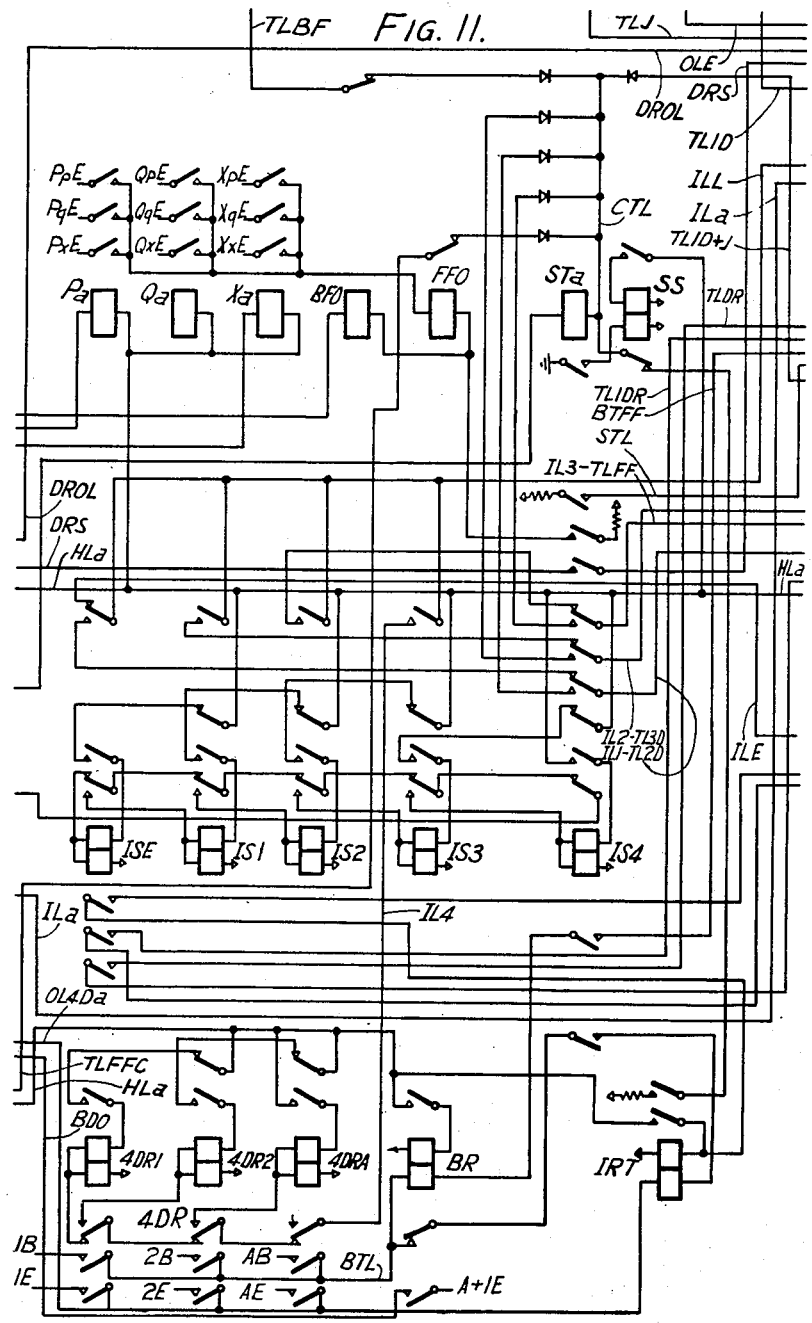

A description will now be given of a call originating over a line having the last two digits 11 to a line having the last two digits AA as illustrated in Fig. 9. When the subscriber lifts his receiver, a circuit is completed for line relay L11 which operates and prepares a circuit from lead 1E, back contact of cut-off relay CO11 to lead OL1. It also connects earth to lead HL1. The leads OL1 and HL1 are common to a set of A calling lines having all but the final digit the same. To each A subscriber's lines there are provided a number of finder-finals PXFF, QPFF, XQFF (see Fig. 1) adapted to serve as first stage finders for the calling lines in question. Each of such finder finals is allocated to a number of routes, PXFF being allocated to the routes Pp, Pq, Px. Leads OL1 and HL1 are connected to contacts of busy relay P1B associated with a finder final of routes Pp, Pq, Px and having access to a group of lines whose penultimate digit is 1, but if this finder final is busy they are extended to another corresponding finder-final QPFF assigned to another set of routes (Qp, Qq, Qx) and if QPFF is busy to XQFF and so on if there are more than three finder finals. It may be assumed that PXFF is idle hence OL1 will be extended over back contact of P1B, lower winding of P1L, back contact of P1CO to lead OLP1, which in turn is connected via a number of parallel circuits through the lower windings of all the numerical relays P11, P12, P1A, forming the finder final P1 and of their respectively associated cut-off relays to leads 1B—AB respectively. For understanding of the circuits, the substation having the last two digits 1A of the same group as subscriber 11 and its associated line equipment L1A and CO1A is illustrated. At instant 1 in the cycle due to the operation of relay L11, a circuit is completed as follows: from earth, lead 1E, back contact of CO11, front contact LO11, lead OL1 back contact of relay P1B, lower winding of P1L, back contact of P1CO, lead OLP1, back contact and lower winding of relay P11, lower winding of relay CO11 to battery on lead 1B. In this circuit relays CO11 and P11 immediately operate and P1L which is slightly sluggish shortly after. Relay CO11 and P11 lock operated through their upper windings in series, locking contact of P11, hold lead HLP1, back contact of relay P1L to earth on lead HL1. When relay P1L energises, it replaces the earth on lead HL1 by a direct earth. CO11 on energising not only disconnects relay L11 to allow it to release, but extends the calling line in conjunction with relay P11 over leads SL11 and SLP1 back contacts of P1CO to earth and battery through the upper winding of relay P1L. Relay P1L when operated is therefore maintained energised direct from the calling sub-station. As soon as P1L energises, it completes a circuit for relay P1B which thereupon extends leads OL1 and HL1 to QPFF to enable the finder final QPFF to be taken into use if free for the next call which is initiated from the group of lines 11—1A. Relay P1L now initiates the operation of the second stage finder illustrated in Fig. 5. It will be noted that if either of the relays CO11 and L11 are operated, the lead 1E is connected to a test lead BTFF which indicates the busy or idle condition of any of the lines of the group to which lines 11 and 1A belong (i. e. those having the same digits up to the penultimate). Each of the lines of the group when busy connects up to line BTFF, a lead to which earth is connected at an instant in the cycle corresponding to that line. For instance, the lead AE is connected up to BTFF when line 1A is busy. Relay P1B similarly indicates when the finder final P1 is busy and in this connection it connects up to a conductor TLFD which indicates the idle and busy condition of the group of finder finals having access to the lines 11—1A to prevent the finder final P1 being seized as a finder switch over any of the routes Pp, Pq, Px, which have access to P1. One way of doing this is to connect leads PpE, PqE, PxE, through rectifiers and front contact of P1B to lead TLFD. P1B in a similar way marks the finder final P1 busy as a final switch to the routes Xp, Xq, Xx on the lead TLFFL which is common to all the finder finals having access as fourth digit selectors to the group of lines 11—1A.

Figure 5:
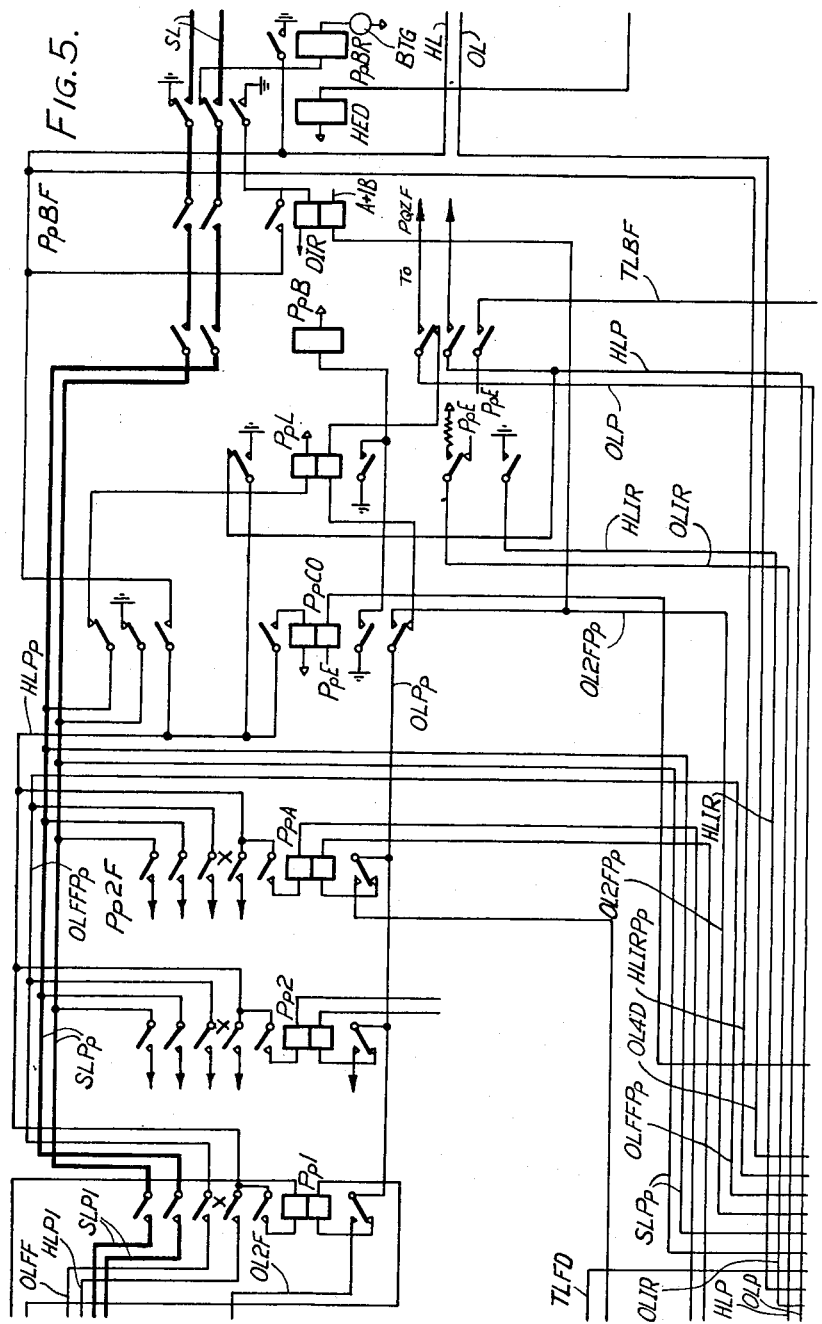

When relay P1L energises in addition to the operations above described, it connects leads 1E from the back contact of P1CO and its own front contact to lead OLP, it also connects earth to lead HLP. Referring to Fig. 5 it will be noted that OLP is connected over a back contact of relay PpB, lower winding of relay PpL, back contact of relay PpCO to lead OLPpQ and thence via back contacts and lower windings of relays Pp1, Pp2, PpA to the lower windings of the cut-off relays associated respectively with such relays to conductors 1B, 2B, AB, respectively, including P1CO and lead 1B. Consequently at instant 1 in the cycle a circuit is completed for the lower windings of relays PpL, Pp1 and P1CO. In this circuit, relays Pp1 and P1CO operate immediately and lock energised through their upper windings, locking contact of relay Pp1, lead HLPp, back contact of relay of PpL to earth placed on lead HLP by relay P1L. When relay PpL energises it substitutes a direct earth for the earth on HLP. Relay P1CO opens the circuit of relay P1L which deenergizes while relay Pp1 connects up the calling sub-station over leads SL11, SLP1, SLPp to earth and battery through the upper winding of PpL respectively on the back contacts of relay PpCO. Relay PpL is therefore maintained energised directly from the calling substation 11 and supplies earth to HLPp, HLP1 to maintain relays CO11, P11, P1CO, Pp1 energised. Relay P1CO completes an alternative circuit for relay P1B to keep relay P1B energised after P1L releases while operate lead OLFF for the finder final which is connected to OLP1 by P1CO is extended by Pp1 to lead OLFFPp, from which it extends to contacts of impulse responder finders and serves to convey to a selected impulse responder the identity of calling substation due to conductor 1E being connected thereto through the front contacts of relay CO11 and P11.

The call is now extended to equipment PpBF from which a busy tone may be fed if necessary to a calling substation.

Operation of relay PpL initiates the operation of selecting an idle impulse responder by disconnecting lead PpE from the operate lead OL1R and connecting thereto battery through a guarding resistance. Relay PpL also connects earth to lead HL1R. These leads extend from Fig. 5 to Fig. 10 where an impulse responder finder is illustrated, represented by the relays Ppa, Pqa, Xxa, which relays are intended as respresentative of the whole of the routes over which a connection can be set up in an exchange. It is felt that the showing of three will be sufficient to illustrate the principles of the invention. It will be noted that the lead OL1R and HL1R extend to the contacts of relay Ba and according as to whether the impulse responder in equipment IRA is busy or idle, so the circuit will be extended to the next impulse responder IRb or control equipment IRa. Assuming that IRa is idle, then the lead OL1R will extend over two successive back contacts in series of Ba to operate lead OL1Ra and thence via the upper windings of relays Ppa, Pqa, and Xxa, lower winding of their respective associated cut-off relays such as PpCO to leads PpE, PqE, XxE, respectively. At the instant Pp, a circuit is completed for relays Ppa and PpCO which energise and lock energised as follows—P$_p$LCO locks energised through its locking contact direct to earth supplied originally through a front contact of P$p$L and subsequently from earth on HLIR via lead HLIRP$p$, operated contact of P$pa$, back contact of relay B$a$. Relay P$pa$ on the other hand locks energised through its lower winding and locking contact and lower winding of relay P$a$ to earth on lead HL1R via another back contact of relay B$a$. In this circuit relay P$a$ operates for a purpose to be described later. P$pa$ connects up leads SLP$p$ to line relay A$a$ which is thereby connected in the circuit previously described to substation 11. Relay A$a$ accordingly operates and completes a circuit from earth on the back contacts of relays OS$a$ and B$da$ for relay B$a$. Relay B$a$ energises and disconnects leads OLIR and HLIR and extends these leads respectively to impulse responder IR$b$ and at the same time connects up a holding earth to maintain operated those relays which were previously locked operated due to earth on ELIR. It also prepares fresh operating circuit for connection to lead OLIR$a$. P$p$CO extends O1P$p$ to lead OL2FP$p$ and P$pa$ extends O12FP$p$ to lead O12F$a$ in the selected impulse responder whereby the connection of lead 1E by P1CO to lead OL2F is extended by P$p$1 to lead OLP$p$ and serves to give an indication of the penultimate digit of the calling party (in this case 1). Relay P$pa$ also connects up in addition to the speaking leads SLP$p$ already referred to, and the lead OL2FP$p$ for identifying the penultimate digit to which the second stage finder P$p$2F responded the lead OLFFP$p$ for identifying thhe final digit of the calling line (in the case 1) to which the finder final responded, the lead HLIRP$p$ already referred to by which earth from operated contact of relay B$a$ is fed to maintain energised the operated relays CO11, P11, P1CO, P1B, P$p$1, P$p$CO. P$pa$ also connects up lead OL4D$a$ to lead OL4D which is eventually required for operating selectors in the selected route in this case the fourth digit selector as will be explained later.

Dial tone can now be transmitted to the calling subscriber in the usual way (not shown) via the windings of relay A$a$ which is cut off when the first series of impulses is dialled. The calling subscriber commences to dial and in doing so, on the first impulse releases A$a$ whereupon a circuit is completed for relay C$a$ as follows:

Earth, back contacts of OS$a$, BD$a$, and A$a$, front contact of B$a$, on the one hand to relay C$a$ and battery and on the other hand via lead 1L$a$, back contact of junction relay JCO (Fig. 12), lead 1LL, back contact of relay ISE, lead ILE, back contacts of relays IDCO, ERA, ER2, ER1, lower winding of relay ER1 to battery. Relay ER1 partially operates and closes its "X" contact and on the completion of the operation operates fully from earth on lead HL$a$ back contact of ER2, windings of E1 in series to battery. In a similar way ER2 operates.

On the assumption that the call being described is a local call and that 2 represents the local exchange, at the end of the first series of impulses ER2 will remain operated. ER2 on operating opens the locking circuit of relay ER1 which accordingly releases and at E2 connects operate-lead OL1DR through back contact of 1DCO, front-contact of ER2, operated contact of ISE to test lead T11DR for the first digit responder 1DR. TL1DR is marked with earth for each of the first digit responders which are idle and are accessible to the calling exchange digit responder (in this case IR$a$) at instants in a cycle characterising such first digit responders so that on the occurrence of the next instant corresponding to an idle impulse responder which it will be assumed to be instant $n$, a circuit is completed as follows:

Earth at instant $n$, lead or E (Fig. 13) back contacts of IDSR and IDH, TL1DR, operated contact of ISE, operated contact of ER2, back contact of 1DCO to OL1DR and thence via back contact and lower winding of relay E2$n$ to battery. E2$n$ operates and extends the leads BTFF, STL, 1L3—TLFF, 1L2—TL3D, 1L1—TL3D and HL$a$ to the first digit responder selected. As the call is a local call relay JCO is not operated and therefore when the second series of impulses is transmitted due to the operation of ISE the impulsing circuit now extends through the front contact of ISE via back contact of 1S4, lead 1L1—TL2D, operated contact of E2$n$ to lead 1L1—TL2D extending to the first digit responder 1DR$n$.

It should at this point be explained how ISE was operated. When relay C$a$ operated with the first impulse of the first series it completed a circuit for the lower winding of ISE through the back contacts of relays IS4, IS3, IS2 and IS1 and ISE, all of which relays act as impulse steering relays for the digits corresponding to their references. ISE operates partially in this circuit and when relay C$a$ releases at the end of the first series of impulses it operates fully from earth on lead HL$a$ back contact of IS1, front contact of ISE, both windings of ISE to battery. ISE therefore changes the impulsing circuit from 1LE to 1L1—TL2D and closes contacts which complete circuits according as to whether a call is for a local call or for a distant exchange to initiate the hunting for either a first digit responder or for a dial repeater respectively and prepares a circuit for the lower winding of relay IS1 in readiness to respond to the second series of impulses. On the second series of impulses being received C$a$ operates again and causes relay IS1 to operate partially while the impulses pass over the circuit previously described to lead 1L1—TL2D extending through Fig. 12 to Fig. 13 back contact of IDSR to relay IDC on the one hand and on the other hand through back contacts of relays 1DRA, 1DR2 to the lower winding of relay 1DR1. Relay 1DR1 partially energizes and closes its "X" contact whereby on completion of the impulse a circuit for fully energizing 1DR1 is completed from earth on HL1DR from HL$a$ over back contact of 1DR2, "X" contact of 1DR1 and both windings of 1DR1 in series to battery. 1DR1 prepares a circuit for 1DR2 which responds in a similar manner to the second impulse. In this case it will be assumed that the first numerical digit dialled is A hence at the end of A impulses 1DRA operates and locks operated, the previous relays having been successively released owing to the opening of their locking circuits by the succeeding relays. 1DRA on operating in addition to preparing circuits to leads OL1D and TL2D for a purpose to be described later, also connects the lead TL2DR via back contact of 1DC, which releases after transmission of the impulses corresponding to the first numerical digit, to the operate lead OL1DRA which is connected via the back contacts and lower windings respectively of the relays 1DA$a$, 1DA$b$, 1DA$n$ to conductors $aB$, $bB$, $xB$. Lead TL2DR is connected to earth at instants corresponding to idle second digit responders 2DR so that if at the next instant $n$ following the operation of 1DA the responder 2DR$n$ (Fig. 14) corresponding to the instant $n$ is idle and no instant has elapsed in the interval which corresponds to another idle second digit responder a circuit will be completed at instant $n$ as follows: Conductor $nE$, back contacts of relays 2DSR, 2DH, lead TL2DR, front contact of 1DRA, back contact of 1DC, front contact of 1DRA, OL1DA and back contact and lower winding of relays 1DA$n$ to battery on conductor $nB$. 1DA$n$ accordingly operates in this circuit and locks operated as follows: battery relay 1DSR, upper winding of relay 1DA$n$ and its locking contact to earth on conductor HL1DR. Relay 1DA$n$ also switches through leads BTFF, STL, 1L3—TLFF, 1L2—TL3D and HL1DR to the second digit responder 2DR$n$ which has been selected. Relay 1DSR opens the circuit of relay 1DH so as to prevent 1DR being taken into use. 1DSR also switches over lead 1L1—TL2D to enable it to be connected up to lead TL2D due to the operation of relay 1DA so as to indicate the idle and busy condition of all second digit selectors having the same numerical significance and which are associated with 1DR$n$.

The seizure of 2DR$n$ due to the placing of earth on lead HL2DR results in the energization of 2DH which by disconnecting conductor nE from TL2DR prevents 2DRn from being taken into use by another first digit responder. It should also be pointed out that on the termination of the first numerical digit relay 1S1 operated fully and connected up the impulsing circuit from 1LL over back contact of 1S4 to lead 1L2—TL3D and opened the locking circuit for relay 1SE which released. The impulsing circuit 1LL is prevented from being extended to reoperate E1, E2, EA owing to its circuit being opened on the energisation of 1DCO.

Figure 12:
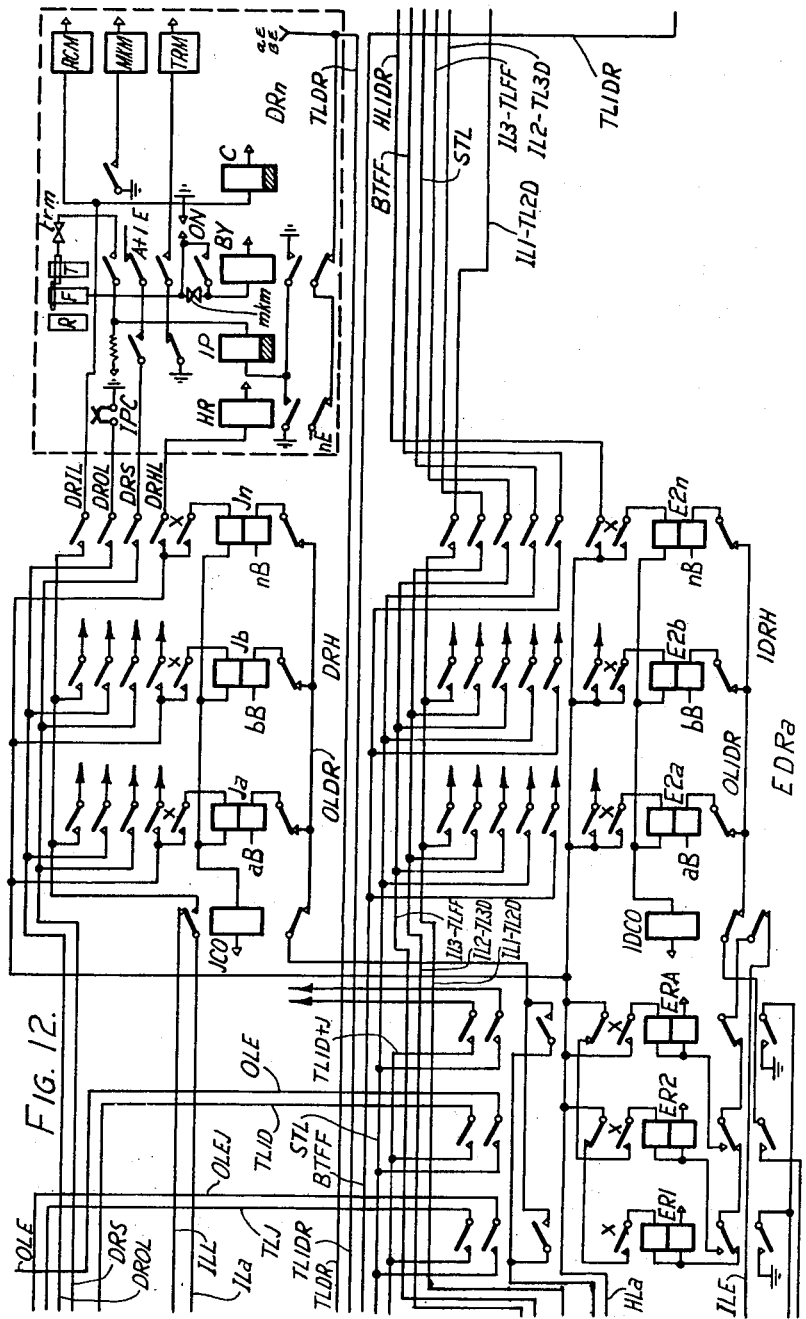
Figure 13:
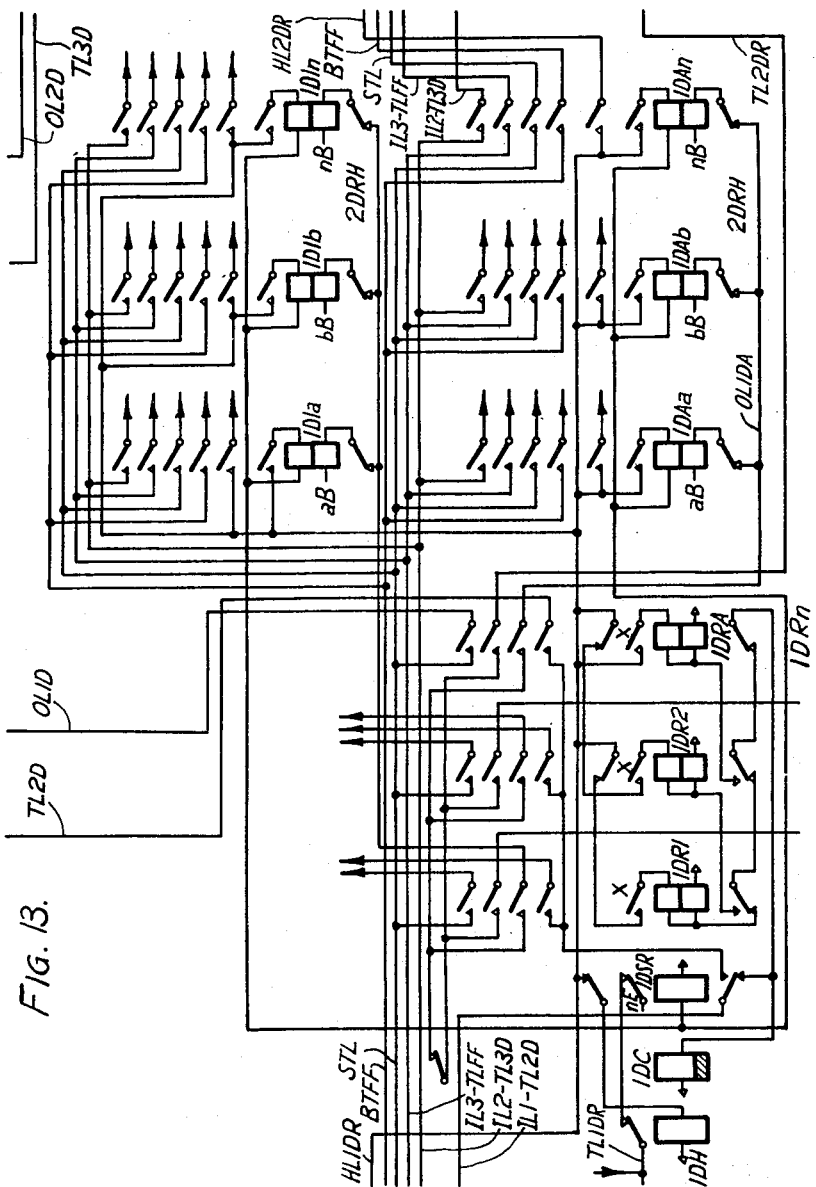

The impulsing circuit now extends over 1L2—TL3D, via Figures 12 and 13 to back contact of 2DSR on the one hand to relay 2DC and battery and on the other hand over the back contacts of 2DRA, 2DR2, 2DR1 to the lower winding of relay 2DR1 to battery. In this circuit 2DC energises and relay 2D1 energises partially to close its X contact to enable it to operate fully through the two windings of relay 2DR1 in series when the first impulse ceases due to the removal of the short circuit to its upper winding. Relay 2DR1 on operating extends the impulsing circuit to relay 2DR2 and the second impulse therefore controls the operation of relay 2DR2 in a similar manner. Relay 2DR2 on operating opens the locking circuit of relay 2+DR1 which releases and assuming that there are A impulses relay 2DRa is eventually energised, opens the locking circuit of the preceding relay and the impulsing circuit 1L2 and connects lead OL2DA— via front contact of 2DRA, back contact of 2DC, front contact of 2DRA to TL3DR which is marked in accordance with the idle or busy condition of the third digit responders 3DR.

It is assumed that 3DRn (Fig. 15) is the first one available after 2DRA operated a circuit will be completed at instant n as follows:

Earth on conductor nE, back contact of relay 3DSR, back contact of relay 3DH, lead TL3DR over the circuit described to OL2DA, back contact of relay 2DAn and lower winding thereof to battery on lead nB. Relay 2DAn accordingly energises, locks energised in series with relay 2DSR to earth on conductor HL2DR and extends leads HL2DR, BTFF, STL and 1L3—TLFF to 3DRn. 2DSR on operating opens the circuit of relay 2DH which releases and at the same time opens another point in the circuit for connecting conductor nE to TL2DR, so as to prevent 2DRn being marked as available. 1S2 now operates fully and releases 1S1 and extends the impulsing circuit to IL3—TLFF over back contact of 1S4. The seizure of 3DRn results in the operation of 3DH which opens a point in the connection from conductor nE to TL3DR to render 3DRn unavailable to other calls while the impulsing circuit from IL3—TLFF extends over the back contact of 3DSR to relay 3DC on the one hand and on the other hand over the back contacts of 3DRA, 3DR2, 3DR1, lower winding of relay 3DR1 to battery. Relay 3D1 partially energises in the manner previously described in response to the first impulse and fully operates over its X contact on the completion of the said impulse. The remaining impulses follow, 3DR2 operates to the second impulse and releases 3DR1 and eventually 3DRA is operated which releases 3DR2 and locks energised, it being assumed that the last digit is A.

Reviewing the result of dialling the exchange digit and the first three numerical digits it will be seen that relay E2 of EDRn has connected up a test lead TL1D to the lead TL1D—J. It has also connected up an operate lead OLE to the lead STL. Similarly relay 1DRA of 1DRn has connected up a lead OL1D to STL and in conjunction with 1DSR a lead TL2D to lead 1L1—TL2D. Similarly relay 2DRa of 2DRn has connected up a lead OL2D to STL and in conjunction with 2DSR a lead TL3D to lead 1L2—TL3D.

Relay 3DRA in the third impulse digit responder 3DRn connects up a lead BTFFA corresponding to the lead BTFF, connects lead TLFF to 1L3—TLFF and OL3D to lead STL. Lead BTFFA indicates the idle or busy condition of the A group of lines including the called line. TLFF indicates an idle or busy condition of the finder-finals having access to the called line while OL3D is the operate lead for the appropriate third digit selectors in each of the routes, that is those digit selectors having the same numerical significance as relay 3DRA. Similarly the test leads TL1D, TL2D, TL3D indicate the idle and busy condition in the various routes of the first, second and third digit selectors respectively required to set up the desired connection and O1E, OL1D, OL2D are the operating leads for the relays in such selectors in the various routes controlled by the respective digit responders and having the same numerical significance as the relays in the digit responders which connect them up. In this way the selectors in the selected route may be operated instantaneously.

On the termination of the third digit 1S3 operates and extends the impulsing circuit over lead IL4, back contacts of relays 4DRA, 4DR2, 4DR1 to the lower winding of relay 4DR1. Relay 4DR1 partially energises and prepares a locking circuit over its X contact in the manner previously described and operates fully on the termination of the first impulse. Similarly relay 4DR2 operates for the second impulse and releases 4DR1 and eventually relay 4DRA operates for the third impulse and releases the preceding relay on the completion of which the fourth impulse 1S4 operates. The fourth numerical digit is thus stored in 1D4 and the testing of the called line can now be initiated.

On the completion of dialling the last digit 1S4 operates fully and connects BTFF to the lower winding of relay BR and thence to busy test lead BTL, to which one of the conductors, 1B, 2B, AB, are connected according as to the value of the last digit dialled. Referring to Figure 9, a lead BTFFA is shown to which whenever a line or cut-off relay of one of the lines of the group of A lines having a penultimate digit A, is operated, one of the conductors 1E to AE is connected to conductor BTFFA corresponding to the value of the last digit of those lines which are busy.

It has been assumed that the final digit of the called line is A as well as penultimate and other numerical digits, so that if the call line AA is busy due either to the line relay or cut-off relay being operated, the conductor AE will be connected to lead BTFFA and this lead will be connected up by the third digit responder to the lead BTFF and thence to one terminal of the lower winding of BR. The fourth digit responder will also have responded to the digit A and therefore 4DRA will be operated and the conductor AB will be connected to the lead BTL and thence to the other terminal of the lower winding of BR. Consequently at instant A in the cycle, a circuit will be completed for relay BR which will operate and lock operated to lead HLa. Relay BR on operating, opens a point in the circuit of relay IRT to prevent hunting for an idle route as will be described later on. Relay BR also connects conductor A+1E through the upper winding of relay BDa to lead OL2Fa. It should be explained that provision is made in the cycle which operates the second stage finder for an instant referred to as instant A+1 because it occurs after instant A of one cycle and before instant 1 of the next cycle, which are required. This instant A+1 is additional to the A instants required for the operation of the finder itself, so that an additional control may be exerted over lead OL2Fa and OL2FIR as will now be explained. Referring to Figure 5 it is noted that OL2FIR in addition to being connected to OLPp by PpCO, is also connected to the lower winding of relay DIR and conductor A+1B. Consequently at instant (A+1) in a cycle a circuit is completed for relays BDA and DIR in series. The operation of relay BDa acts as a breakdown relay for all relays which are locked upon lead HLa, that is those relays which are maintained operated in dependence on earth supplied from the impulse responder 1Ra, that is to say, it opens the circuit of relay Ba which after its slow release period removes holding earth from lead HL*a*. Relay DIR completes a circuit for a busy relay P*p*BR as follows: earth on back contact of HED which is operated whenever any of the relays of the associated exchange digit selector are operated, front contacts of DIR, and P*n*B one of the conductors SLP1, SLP1 back to the calling subscriber's station and returning the other conductor SLP1, SLP*p* front contacts of P*p*B, and DIR, back contact HED, relay P*p*BR, busy tone generator BTG to battery. Relay P*p*BR energises in this circuit and connects earth direct to lead HLP*p* so as to maintain the relays P*p*1, P11, P*p*CO, P1CO and CO11 operated, before relay B*a* has released. In this way the impulse responder and all its associated equipment is alone released and meanwhile the calling subscriber is given the busy signal from the busy tone BTG until he hangs up his receiver. The equipment locked up on his line is only the finder-final P1 and the second stage finder PP2F and associated equipment. When the calling subscriber hangs up, P*p*BR releases and by removing earth from HLP*p*, releases all the equipment in readiness for another call.

If the called line is idle no circuit will be completed via relay BR as described, consequently when on the termination of the transmission of the fourth numerical digit, 1S4 operates, a circuit will be prepared for relay IRT which initiates route testing as follows: conductor AB, front contact of relay 4DRA, back contact of relay BR, front contact of relay 1S4, lower winding of relay IRT, front contact of relay 4DR*a* to conductor AE. Consequently, at instant A, and assuming the called line is idle, this circuit is completed and relay IRT energises and locks energised and connects battery through guard resistance, back contact of relay SS to the common-test lead CTL. CTL is connected via relay ST*a*, front contact of relay B*a* to lead OL1R*a* and thence to the upper windings of relays P*pa*, P*qa*, X*xa* and the lower windings of their respective cut-off relays to conductors P*p*E, P*q*E, X*x*E respectively. Common test lead CTL is also connected via suitable rectifiers to various test leads by which the condition of apparatus necessary to set up the connection to the wanted party is tested to see what routes are available for the setting up of the connection under consideration. It will be noted that there are six connections each through a rectifier so as to prevent potentials on one test lead affecting another test lead. In this test it is important to be sure that the finder-final and the second-stage-finder used for connecting the calling line with the impulse responding equipment 1R*a* are not marked as busy, as of course such equipment may be used to continue the connection while alternatively, one connection may include the same finder-final but a different second stage finder, or an entirely different finder-final and second-stage-finder.

The test lead TLFD which indicates the finder-finals which are available to reach the calling line, is connected up as will now be described. Lead OL2FP*p* which identifies the penultimate digit and has earth connected thereto at instant 1 in a cycle as previously described, by relay P1CO is extended via front contact of P*pa*, to lead OL2F*a* back contact of relay FRCO, back contact and lower winding of relay FR1 to conductor 1B so that at instant 1 in the cycle a circuit is completed for relay FR1 which locks energised on the lead HLIR*a*. Relay FR1 therefore which is one of a group of finder responder relays FR1, FR2, FRA which determine the test lead of that group of finders giving access to the calling line connects up a test lead TLFD to indicate the idle and busy condition of those finder-finals whose penultimate digit is 1, and this is connected to lead TLFFC and thence via back contact of relay FFO and a rectifier to lead CTL. FFO is arranged to open this circuit at the instants in a cycle corresponding to those allocated to the finder-final in use for connecting the calling line to the impulse responder. Relay P*a* operates whenever any of the relays P*pa*, P*qa*, P*xa* are in use as it is connected in common to their various circuits of which the locking circuit for P*pa* and P*qa* is alone illustrated. To assist in understanding the general arrangement relay Q*a* is shown, although there are no relays in the impulse responder finder illustrated with the first reference Q, also relay X*a* which is connected in locking circuit of relay X*xa*, and other similar relays having the first reference X. In the present case relay P*a* is energised and connects up leads P*p*E, P*q*E and P*x*E through rectifiers not shown a common lead extending to FFO which is connected to battery when relay 1S4 operates. Consequently FFO will operate at instants P*p*, P*q*, and P*x* to disconnect TLFFC from CTL. That is to say, at all those instants which indicate the calling finder-final P1 as being busy. It will be seen that if finder final Q1 had been used for the call Q*a* would be operated and FFO would operate at instants Q*p*, Q*q*, Q*x* while if X*a* was operated, FFO would operate at instants X*p*, X*q*, X*x*.

The busy condition of all the BF equipments of the various routes with which the second stage finals are permanently connected, is extended from lead TLBF over the back contact of BFO and rectifier to lead CTL. The circuit for BFO extends via battery, contact of 1S4, BFO to a lead to which conductor P*p*E is connected by relay P*pa* so that BFO is operated periodically at the instants P*p* in a cycle to open the connection of TLBF to CTL. In this way the second-stage-finder used for connecting the calling line to the impulse responder, is prevented from being indicated as being busy on CTL.

Other connections to CTL over rectifiers, include the connection to TL1D+J. This lead is used in common for testing idle junctions or for idle local first digit selectors. As the call being considered is a local call, this lead is used for indicating the idle condition of the first digit selectors, and as previously described is connected by relay B2 to lead TL1D. The remaining three connections to CTL extend via operated contacts of 1S4 to leads 1L3—TLFF, 1L2—TL3D, 1L1—TL2D which are in turn connected up by the respective digit responders 3DR*n*, 2DR*n*, 1DR*n*, by which respectively the idle and busy conditions of the appropriate finder-finals, third digit and second digit selectors by which the desired connection can be set up are marked for the various routes. It will therefore be appreciated that the circuit through ST*a* will only be effective at an instant when there is no earth placed on CTL by any of the test leads referred to. This instant could of course, be any of the instants P*p*—X*x*, but in the present case to keep the description and drawings as simple as possible it will be assumed that there is no earth connected to CTL at the instant P*p*, and that this instant occurs after the operation of 1RT and before any other available path is tested. As P*pa* and P*p*CO are already operated, this circuit is only effective to enable relay ST*a* to operate.

ST*a* it will be noted only operates for the remainder of the instant corresponding to the routes selected which in this case is assumed to be P*p*. In order to be sure that the operations controlled by ST*a* can take place effectively, it is desirable to make sure that the duration of the instants are sufficiently prolonged, not only to allow for the operation of ST*a* and P*pa* but also for the operations about to be described. ST*a* connects battery through a suitable guarding resistance to lead STL. Several connections have been made by the various digit responders to STL and each one will be described in turn.

E2 (Fig. 12) on operating connects STL to lead OLE which extends to lower windings of relay E2 in the exchange digit selectors in the various routes to which EDR*a* is assigned, so that in the particular case considered, battery will be extended over lead OLE to relay E2 of the exchange digit selector in route P*p* (Fig. 6) at instant P*p* and earth on conductor P*p*E and thereby operate relay E2 in digit selector P*p*ED to the exclusion of the corresponding relays on the other routes whose lower windings will also be connected to OLE but also to leads to which earth is connected at instants of the cycle corresponding to those specific routes. E2 therefore energises and locks to earth on H1 energised. It also extends leads HL, OL, SL, to which references will be applied to the hold lead, operatic lead and speaking leads extending forward to the called lines from the busy feed equipment P$p$BF, to which the second-stage-finder P$p$2F is connected, to battery feed set P$p$BTF which is associated with the first digit selector P$p$1D, that is the first digit selector of route P$p$ accessible to the calling line considered.

Figure 8:
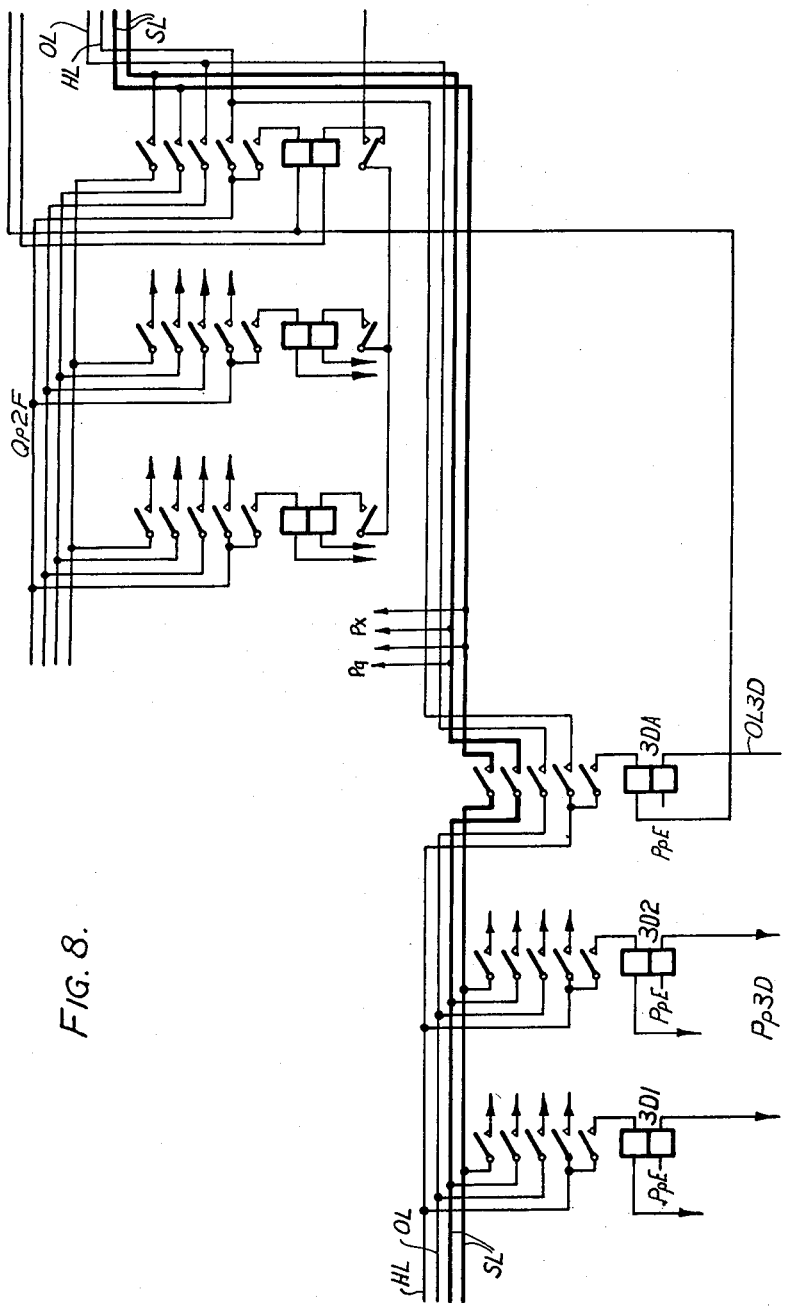
Figure 14:
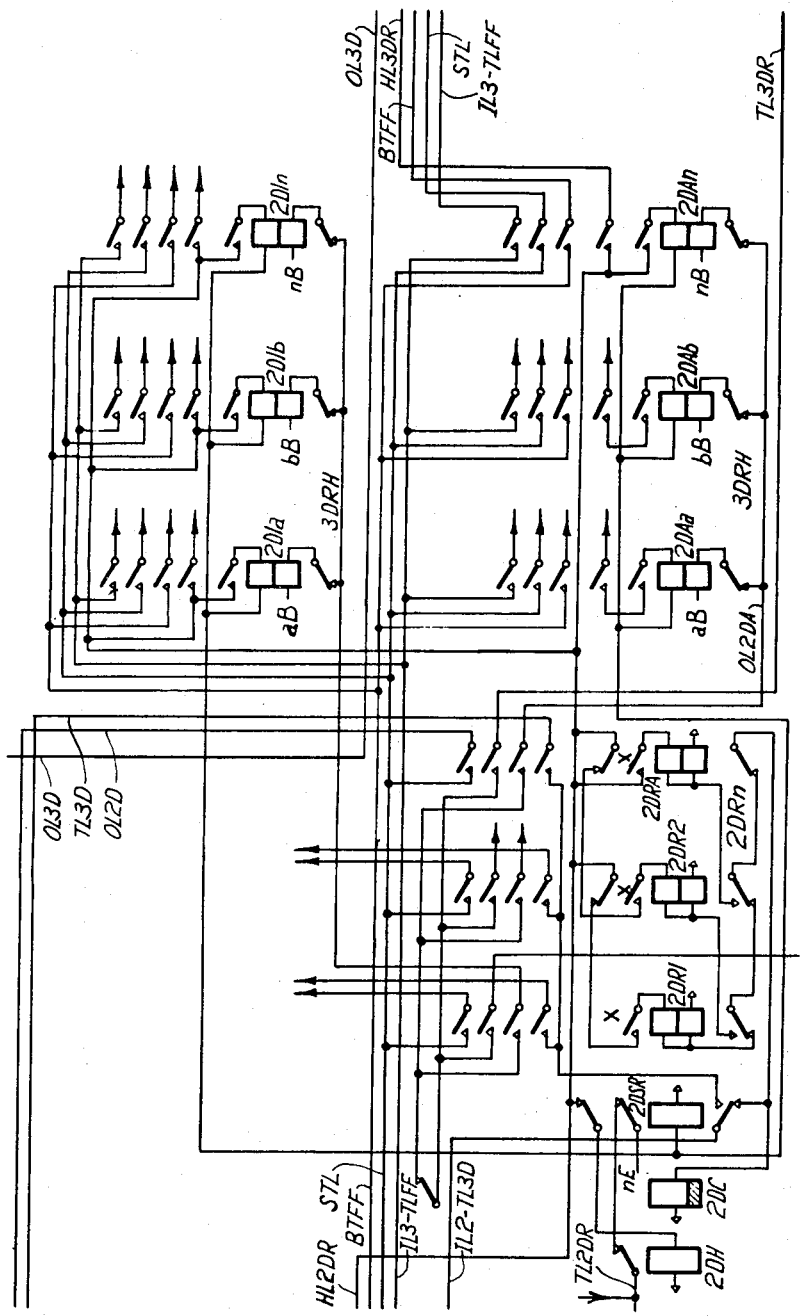

STL is also connected by 1DR$a$ of DR$n$ (Fig. 13) to a lead OL1D which extends to the relays 1DA of the first digit selectors of the various routes which selectors are assigned to the group of A2 lines of which the calling line is one to the lower winding of relay 1DA (Fig. 7) and thence to lead P$p$E. Lead OL1D has access to relays similar to relay 1DA, that is having the same numerical significance in all the routes, but it is to be noted that it does not have access to similar relays to the same route which are accessible to different groups of subscribers' lines from that to which the calling line belongs, as the first digit selectors assigned to other groups of lines must also have assigned to them other first digit responders for purposes of controlling their operation. Such another digit selector is illustrated having exactly the same reference letters but having different operating leads. It will be noted however, that the test lead TL2D is common to such selectors. That is to say, a conductor P$p$E may be connected up by either of the relays shown and other (not shown) to the test lead TL2D. This is because outlets connected up by the corresponding relays of the different first digit selectors are multipled together as shown, so as to share in common the same second digit selector P$p$2D. Of course the test lead TL2D will not be shared in common by first digit selectors whose outlets are not common, as will be clear by reference, Figures 1–3. 1DA in route P$p$ illustrated operates and locks operated to earth on lead HL which is extended by P$p$ED from P$p$BF which in turn receives it over HLIRP$p$ from a contact of relay B$a$ in the impulse responder IRA illustrated in Figure 10. It will be understood that E2 of P$p$ED was similarly locked operated. Turning now to Figure 14 it will be noted that the relay 2DRA in the second digit responder 2DR$n$ has connected up lead STL to lead OL2D which extends among others to relay 2DA of P$p$2D Figure 7, and thence by its lower winding to lead P$p$E. 2DA accordingly energises and locks energised to the earth on lead HL and extends the connection from the out-put side of P$p$1D to the third digit selector P$p$3D. (Fig. 8.)

Figure 15:
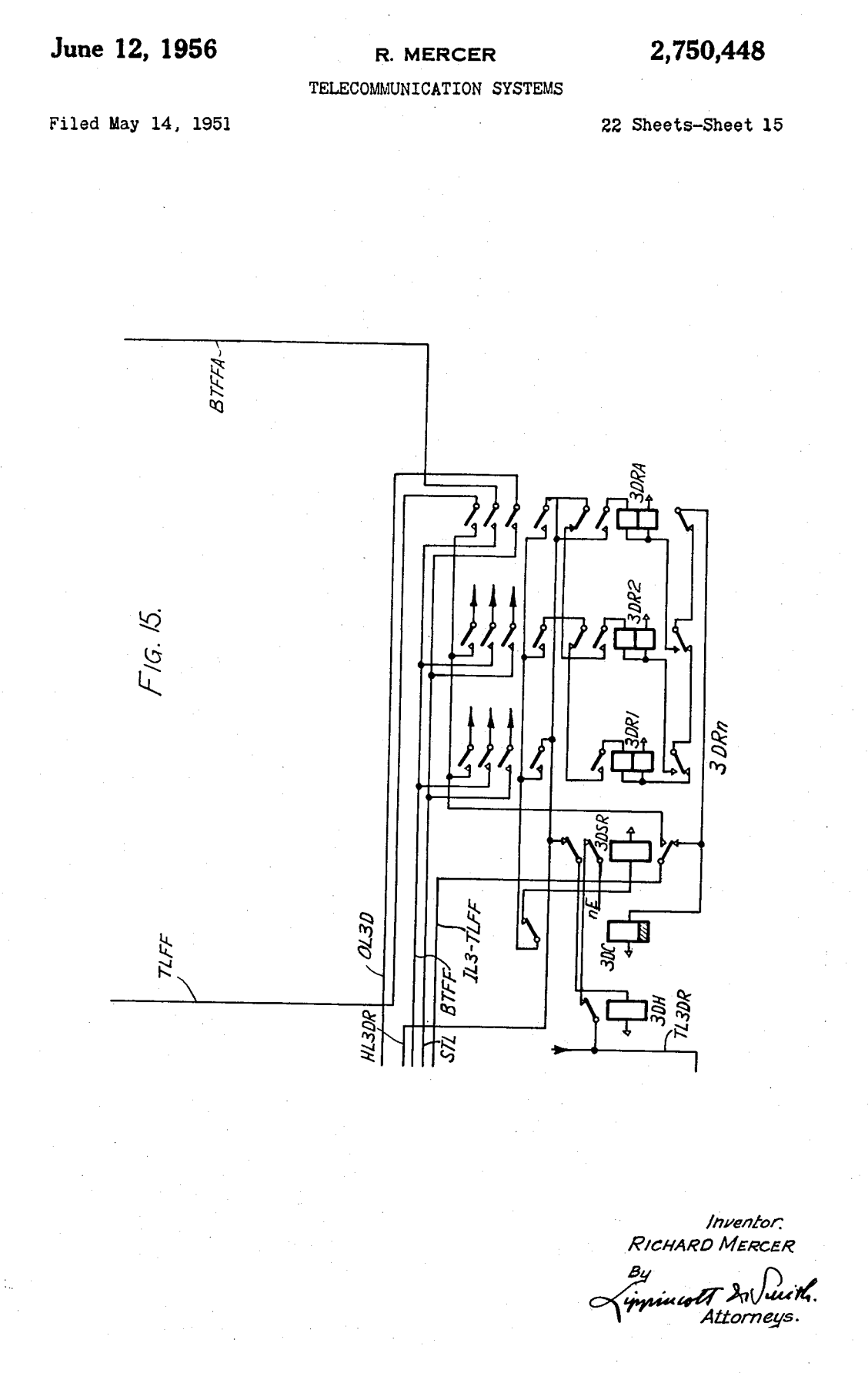

Turning to Figure 15 it will be noted that the relay 3DRA extended lead STL to lead OL3D which among others is connected to the lower winding of relay 3DA of P$p$3D (Fig. 8) and lead P$p$E. P$p$3DA therefore operates and locks operated to conductor HL in series with the upper winding of relay QACO and extends the connection from the busy feed equipment P$p$BTF to finder-final QPFF to which the called line having the final digit AA is assigned. In this way during the instant P$p$ the exchange digit selector, first digit selector, second digit selector, and third digit selector have been selectively operated and the next operation is the operation of the final-digit-selector QPFF. This operation is effected over the lead OL4D and 4D extended from the impulse responder IR$a$ (Fig. 10) and more particularly from the fourth digit responder 4DR associated therewith. It will be borne in mind that relay 4DRA was operated in response to the last digit of the called number. On operating it connected lead AE via lead OL4D$a$ back contact and lower winding of relay OS$a$, front contact of relay P$p$a to lead OL4D which is now extended over leads marked OL by the exchange digit selector P$p$ED the first, second and third digit selectors P$p$1D, P$p$2D, P$p$3D respectively to lead OL (Fig. 9) which incidentally is also accessible to the second-stage-finders Q$p$2F, Q$q$2F, Q$x$2F of which Q$p$2F is illustrated. Relay QACO which operates and was locked operated in series with the upper winding of 3DA extends OL to the operate lead OLQA of QPFF which in turn is extended via the back contacts of relays QA1, QA2, QAA respectively and the lower windings of said relays to leads 1B, 2B, AB, via the lower windings of their respective associated cut-off relays, COA1, COA2, COAA. As earth is connected to OL4D$a$ at instant A in the cycle, the relays QAA and COAA will operate in series and will lock operated to lead HL.

Battery feed equipment B$p$BTF (Fig. 6) associated with the first digit selector P$p$1D (Fig. 7) is connected to the calling line via leads passing through the operated contacts of COAA, QAA, 3DA, 2DA, 1DA. As a result ringing current is fed to the calling line via the ringing trip relay RT to ring the wanted subscriber's bell. When the wanted subscribed answers, RT operates and extends the calling line to the wanted line relay WLR. In the meanwhile relay OS$a$ in IR$a$ (Fig. 10) which energizes in series in the operating circuit for relays QAA and COAA opens the operating circuit and locks operated to earth on conductor HL$a$. It also disconnects earth in the circuit of relay B$a$ which releases shortly after and disconnects earth both from lead HL$a$ to release the impulses responders 1R$a$, EDR$n$, 1DR$n$, 2DR$n$ and 3DR$n$ and from lead H$h$IRP$p$ which has no effect in this case as the calling line is now connected through to the calling line relay CLR in P$p$BTF (Fig. 6) which is therefore energised. CLR completes a circuit for relay B which places earth on lead HL to which lead HLIRP is connected.

If the route over which the connection is set up does not include the first and second-stage-finder used to connect up 1R$a$ initially, i. e. if the said route is not route P$p$ the finder final and the second stage finder or the second stage finder only will require to be operated depending upon whether the route selected includes the finder final in use or not. This operation takes place automatically on the selection of the route as the leads OLFFP$p$ and OL2FP$p$ will be connected in the corresponding leads of the selected route and at instant 1 in the cycle used for operating finder-finals and second stage finders circuits will be completed from operated contacts of relay CO11 and P1CO for operating relays in the finder final and second stage finders in the selected route corresponding to relays PA and P$p$1 in route P$p$. Of course if the finder final PXFF is still required then relay PA will be already operated. As PXFF and P$p$2F of the route originally used by the calling party are held by earth from relay B$a$ through contacts P$p$a, these operated relays can no longer depend on B$a$ when 1R$a$ and with P$p$a are released. If PXFF is still required but not PXFF, for instance if route P$q$ is selected then the operated relays of PXFF will be held from the battery feed equipment of this route but those of P$p$2F will release. This is because the cut-off relays are held energised in series with an operated relay of the finder.

The connection is now established between the calling and the called line via PXFF, P$p$2F, P$p$ED, P$p$1D, P$p$2D, P$p$3D and QPFF. Battery is fed to the calling subscriber through the windings of relay CLR which is maintained energised as long as calling subscriber's receiver is off the hook and completes a circuit for relay B which connects earth to the holding lead before relay B$a$ has released to maintain the connection. The wanted sub-station line is fed with battery through the windings of relay WLR, which relay responds when the called subscriber lifts his receiver, and can be employed in the usual way to control the operation of the calling subscriber's meter or to enable the charge to be assessed for the call in any other of the recognised methods. It will be obvious that the connection will be released immediately the calling subscriber hangs up, due to the de-energisation of CLR followed by the de-energisation of relay B.

Consideration will now be given to the operation which takes place if the exchange digit dialled by the calling subscriber corresponds to a distant exchange, in which case the connection must be set up over an outgoing junction. It will be noted, by referring to Figure 1, that there may be a single outgoing junction for each route from Pp to Xx. As the junction lines are generally much more costly than local routes, unless the exchanges are very near together or in the same building, it is desirable to make sure that the junction lines are used efficiently and this is conveniently effected by providing for each route a small capacity junction hunter such as PpJ1 illustrated in Figure 6. For instance if there were fifty junction lines between the calling and called exchange, which were required to meet the traffic conditions likely to be met with and there are 20 routes, then the capacity of the junction hunter could be three, in which case some of the junction lines could appear as common to more than one route. In this way the fact of one route being engaged for a local call need not interfere with the use of a junction line. Obviously the above is only given as one example and many variations are possible.

In the present invention by way of example only, a single small group of junction lines for each route will be described, in which a junction finder is made available in common to a number of exchange digit selectors associated with different groups of calling subscribers' lines.

The operation in setting up the call up to the dialling of the first digit, is the same as described with reference to a local call. It will now be assumed however, that instead of the calling subscriber calling the digit 2 corresponding to a local call, he dials the digit 1 corresponding to a call to exchange 1. Consequently on the first series of impulses relay ER1 (Fig. 12) operates and locks operated through both windings in series and its "X" contact to the hold lead H1a. As before 1SE operates on the termination of the first series of impulses representing the exchange digit and completes a circuit as follows: From test lead TLDR (which is marked in accordance with idle or busy condition of a number of dial repeaters such as DRn) front contact of 1SE, front contact ER1, back contact of JCO, to operate lead OLDR whence connections are made to leads aB, bB, nB through back contacts and lower windings respectively of relays Ja, Jb, Jn. If it is assumed that the next idle dial repeater to be available is DRn then earth will be connected to TLDR from lead nE at instant n in a cycle through back contacts of hold relay HR and relay BY of dial repeater and thence via the circuit described through to lead OLDR, back contact and lower winding of relay Jn to lead nB to which battery is connected at instant n so that in this circuit relay Jn operates and locks operated in series with relay JCO. At the same time Jn switches through the leads DR1L, DROL, DRS and DRHL to the dial repeater and lock operates to HLa. Relay JCO on operating disconnects OLDR so as to prevent any of the other relays Ja to Jb being operated if the corresponding dial repeaters are free, and at the same time opens the impulse circuit from 1La and connects it up to lead DR1L whereby subsequent impulses dialled by the calling subscriber are fed into the dial repeater DRn. In the dial repeater HR operates in response to earth on DHRL. Relay HR closes a circuit for relay IP. IP energises and opens a point in the circuit of TRM.

When 1SE and ER1 operated a circuit was completed for relay IRT from earth, operated contacts of ER1 and 1Se upper winding of relay IRT to battery. IRT operates and completes a circuit from battery and guard resistance, front contact of IRT, back contact of SS to lead CTL and thence via relay STa, front contact of relay Ba, lead OLIRa and thence via upper windings of relays Ppa, Pqa, Xxa etc. to lower windings of associated cut off relays such as PpCO to leads PpE, PqE, XxE etc., respectively.

CTL is connected as previously described to leads TLFFC and TLBF by which earth is applied to CTL through a rectifier at instants corresponding to each finder-final and BF equipment having access to the calling line which is busy. As before relays BFO and FFO ensure that the finder-final and BF equipment over which the impulse responder IRa was seized are not rendered unavailable.

CTL is also connected via lead TL1D+J and front contact of ER1 to TLJ which is marked with earth corresponding to instants in a cycle assigned to outlets of exchange digit selectors which have no availability to an idle junction line leading to exchange 1, for instance, if E1 is energised in PpED it connects lead PpE to TLJ while lead PpE is also connected to TLJ if all the outlets of PpED, namely PpJRa, PpJRb and PpJRn (PpJRn only is shown in full) are all busy. This connection may be traced from PpE, front contact of JBn, front contact of JBb, front contact of JBa, to TLJ. As TLJ is connected not only to relays E1 associated with each route but also to a number of relays such as E1 in routes assigned to a number of groups of calling lines it will be clear that if any relays such as E1 is operated TLJ must be marked busy at instant Pp in the cycle. Also if all the junction repeaters such as PpJRa, PpJRb, PpJRn accessible to a group still larger of calling lines are all busy then earth must be connected to TJ at an instant in a cycle corresponding to the route to which said junction repeaters are assigned.

If one assumes as in the case of a local call that route Pp is available then a circuit will be completed at instant Pp for relay STa in series with Ppa and PpCO. As the latter relays are already operated Sta alone operates and connects battery to STL to complete a circuit via operated contact of ER1 to lead OLEJ and thence as STa is operated only at instant Pp to lower winding E1 in PpED and earth on lead PpE. E1 operates and locks operated to earth on lead HL and extends HL, OL, SL to PpJ1. Earth on HL causes J1H to operate and complete a circuit from TLJR to OLJ1. TLJR is marked in accordance with the idle or busy conditions of the junction repeaters such as PpJRn to which PpJ1 has access; for instance, if PpJRN is idle lead nE is connected to TLJR through back contact of relay JBn, similarly leads bE and aE are connected to TLJR through back contacts of relays JBb, JBa if the corresponding junction repeaters to which these relays belong are respectively idle. OLJ1 on the other hand is connected through back contacts and lower windings of relays PpJa, PpJb, PpJn to leads aB, bB and nB respectively. If n is the next instant after the operation of J1H that a junction repeater is available a circuit will be completed for PpJN which energises and locks in series with J1BR. J1BR opens the circuit of J1H which releases and also disconnects TLJR from OLJ1. PpJn in addition to locking on to lead HL extends HL, OL, SL to the selected junction repeater PpJRn.

The selector junction repeater comprises a line relay JCLR for feeding battery to the calling line when impulsing is completed. A polarised relay JPR which is normally polarised but not energised by earth fed over HL and is adapted to be energised when current fed from the distant exchange is reversed to that normally on the line. The second winding of JPR which responds to this current also acts to provide a circuit for the line relay at the distant exchange. Lead OL is connected to an impulse relay JIR which is normally energised over the following circuit: earth on impulsing springs IPC of the dial repeater DRn (Fig. 12) lead DROL, operated contact of Jn, lead DROL, which joins OL4Da and thence via operated contact of Ppa to lead OL4D (Fig. 5) lead OL (Fig. 6) operated contacts of E1 and PpJn to relay JIR and battery. Relay JIR accordingly energises, completes a circuit over the junction line JL for the line relay at the distant exchange in series with the upper windings of JPR, completes a circuit for relay JBn which energises and places another earth on the hold lead HL and also prepares a circuit for relay JCR. It also opens the circuit from lead nE to TLJR so as to render PJRn unavailable to other calls and closes one point in the circuit from lead P*p*E which is extended to TLJ when the remaining relays such as P*p*JR*a*, P*p*JR*b* are operated.

It will be appreciated that this operation takes place in a very short interval of time and in the meanwhile the dial repeater DR*n* may have been responding to the first series of impulses transmitted over IL*a*, front contact of JCO, front contact of J*n* to lead DRIL and thence to the stepping magnet RCM of the dial repeater and relay C in parallel to battery. The dial repeater diagrammatically illustrated corresponds to that described in detail in British patent specification No. 458,095, which is also disclosed in U. S. Patent No. 2,188,461, although it will be understood that with proper modifications other forms of regenerative impulse repeaters may be employed. All that is necessary is to provide an equipment which will receive impulses and retransmit them after a suitable or controlled delay, preferably the retransmitted impulses are corrected both as regards speed and make and break ratio.

In the dial repeater described, the transmission does not take place until the first digit is completely received. That is to say, in response to the first series of impulses RCM operates and stops a ratchet wheel R a number of steps in accordance with the number of impulses in the series being received and gives additional tension to the spring by which it is coupled to the transmitting dial T. Relay C which operates in parallel with RCM closes a circuit for marking magnet MKM from earth *mkm*, and at the end of the first series of impulses when relay C releases MKM is de-energised and in releasing cause a pin in pin carrying member F (corresponding to the first digit dialled) to be moved into the path of a pin carried by disc wheel T. Disc T is prevented from rotating because it is held by a pin head displaced in F (by the last call). When magnet MKM is de-energised at the end of the first series of impulses, it pushes a pin into the path of disc T. Contacts *mkm* which opened when MKM energised now close and as ON springs close when R moves from T, a circuit is completed for BY which locks independent of *mkm*.

A short circuit for the relay IP is made by connecting earth direct to the guarding resistance via off normal contacts ON, pins in wheels F and T, contacts *trm* controlled by transmitting magnet TRM, front contact of BY to the junction point of the guarding resistance and relay IP. IP is slow to release and is made more sluggish by the short circuit but it does eventually release and completes a circuit for TRM as follows: earth, back contact of IP, front contact of BY, TRM to battery. TRM operates and allows magnet T to release disc T from the pin which normally held it in engagement, the short circuit on IP is opened by contacts *trm* and IP again operates to allow TRM to de-energise, TRM has however released T from the last holding pin and permits it to move towards the pin just operated, the movement of T being so controlled that the impulses generated by the intermittent openings of the contacts IPC are of correct speed and make and break ration.

It will be appreciated that quite a time will elapse before impulses are transmitted and it is anticipated that the seizure of an idle junction repeater will have been effected in that interval. If, however, a longer interval is desired suitable delaying means may be provided in the dial repeater equipment to prevent the transmission taking place before the longest possible time it would take to seize an idle impulse responder has elapsed. Subsequent series of impulses are stored similarly on RCM and retransmitted by IPC. When the last impulse is stored and retransmitted contacts ON open and relay BY releases. The incoming series of impulses successively operated relays IS1, IS2, and IS3 and IS4 as previously described via relay C*a*. When the last series of impulses was transmitted IS4 operated and a circuit is then completed as follows: lead A + 1E, back contact of relay BY, front contact of IP, lead DRS via operated contact of J*n* to operated contact of IS4, upper winding of relay BD*a* to lead OL2F*a* lead OL2FP*o* and thence via lower winding of relay D1R to conductor A + 1B so that at instant A + 1 in a cycle relay DIR is energised and also relay BD*a*. BD*a* serves to open the energising circuit for relay B*a* which releases shortly after while relay DIR locks energised and completes from the calling line a circuit to JCLR which energises and completes an alternative circuit for relay B*n* which feeds earth backwards when earth is removed from hold lead HL and the other hold leads by a relay B*a*. A call is thus extended to the distant exchange which may be of any known type, that is to say, one which responds to series of impulses or of the same type as that described. The operation in the latter case will be understood by referring to the description hereinafter of an incoming call.

It is to be noted that if the calling subscriber should hang up before completing the last digit then HR and J*n* will release on the removal of holding earth but relay BY will ensure the continued operation of the dial repeater until the off normal springs ON open and permit relay BY to release. Hence lead *n*E is not connected back to TLDR until both HR and BY release.

A description will now be given of an incoming junction call with reference to Figures 16, 17, 18 and 19 and 20 which represent equipments specially designed for incoming junction working, and part of Figures 7, 8, 9, 13, 14 and 15 which represent other equipment used for both local and incoming junction calls.

Figure 6:
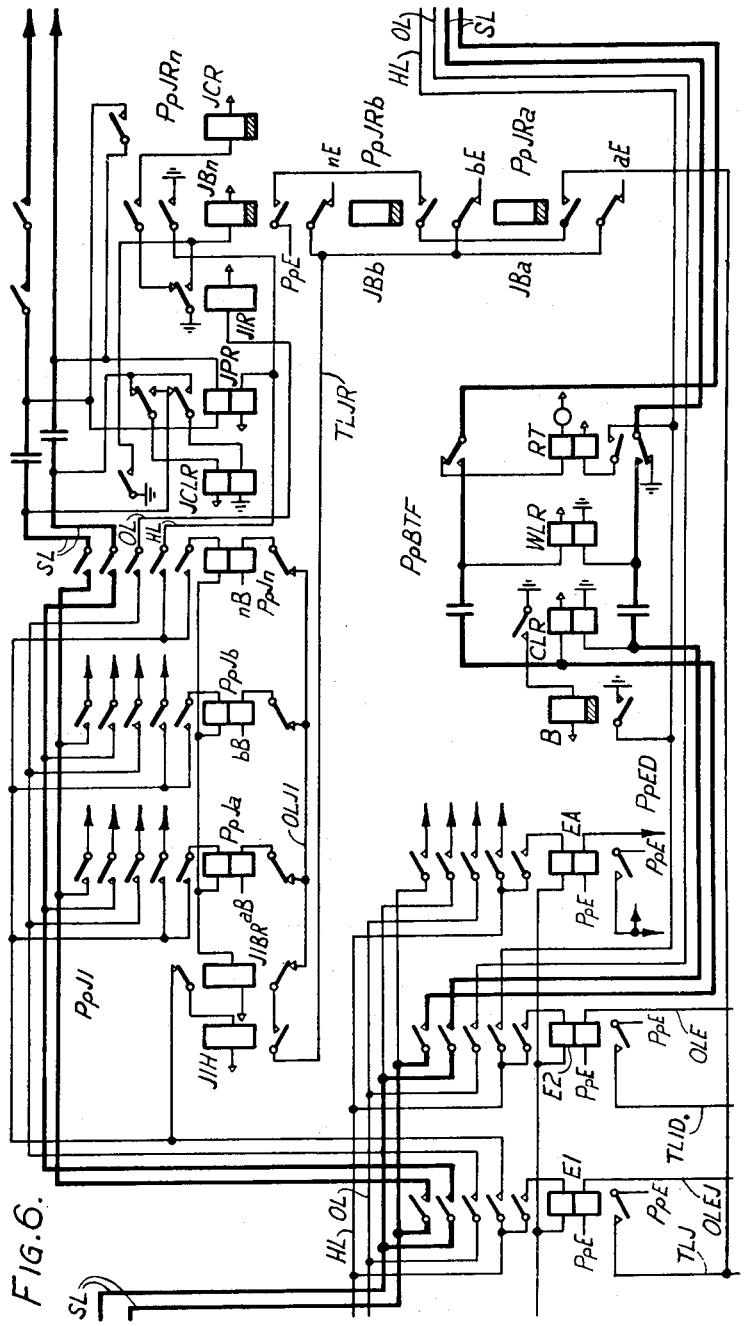
Figure 7:
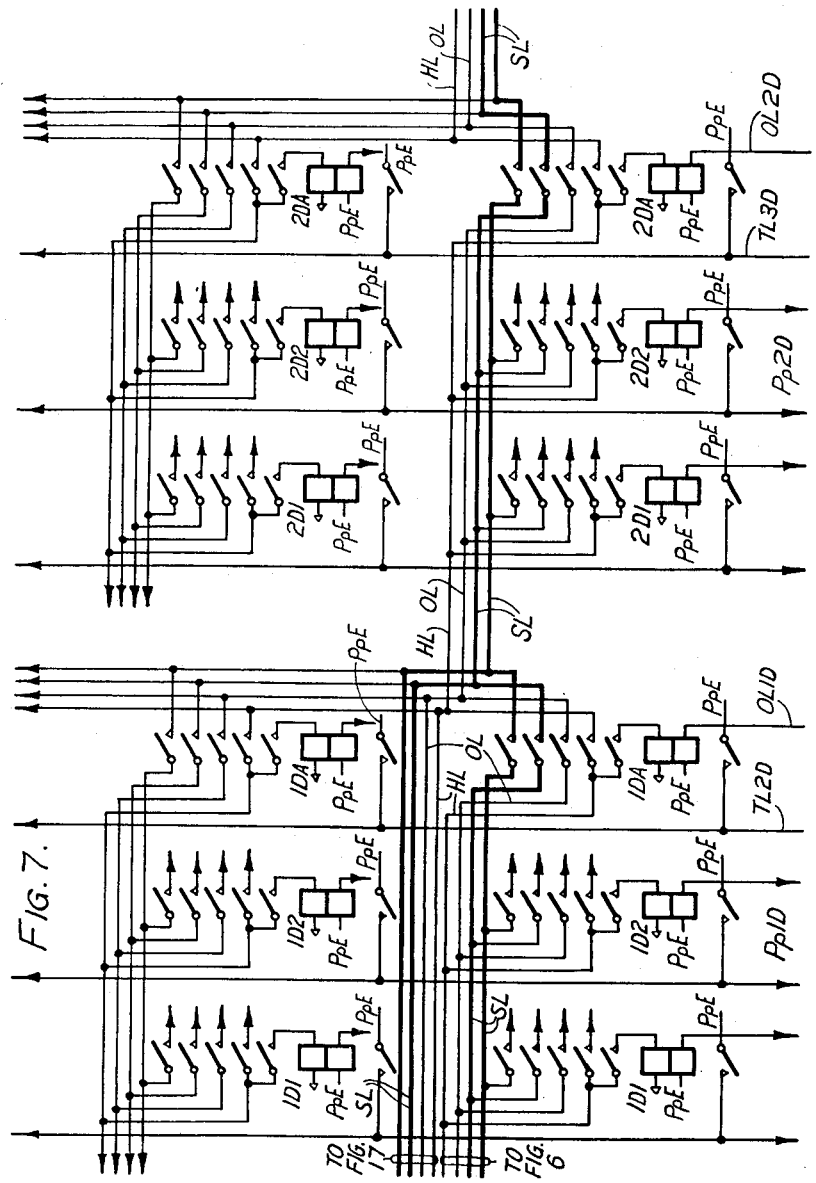

It will be assumed that the call comes in over the junction JC which may be of any of the junction lines 111, to AGG illustrated in Figure 3 and that the connection is set up under control of a dial repeater in the manner described with reference to Figures 6 and 12.

Figure 16:
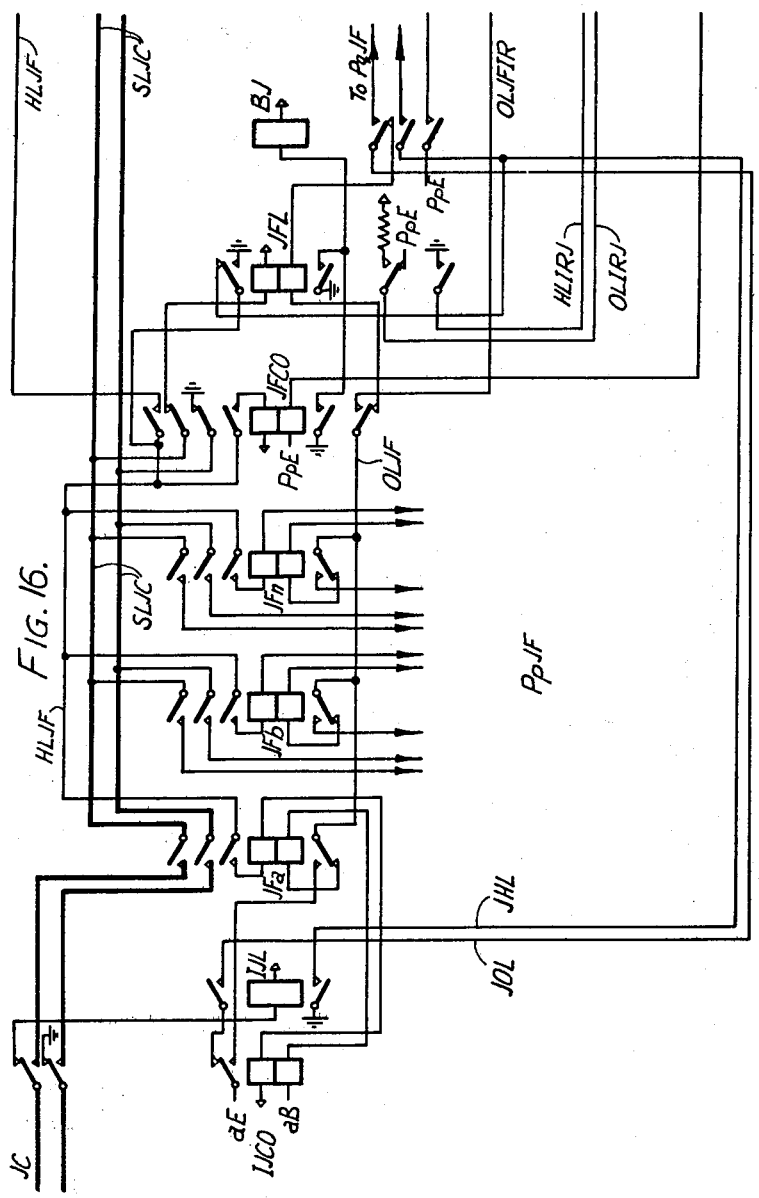
Figure 17:
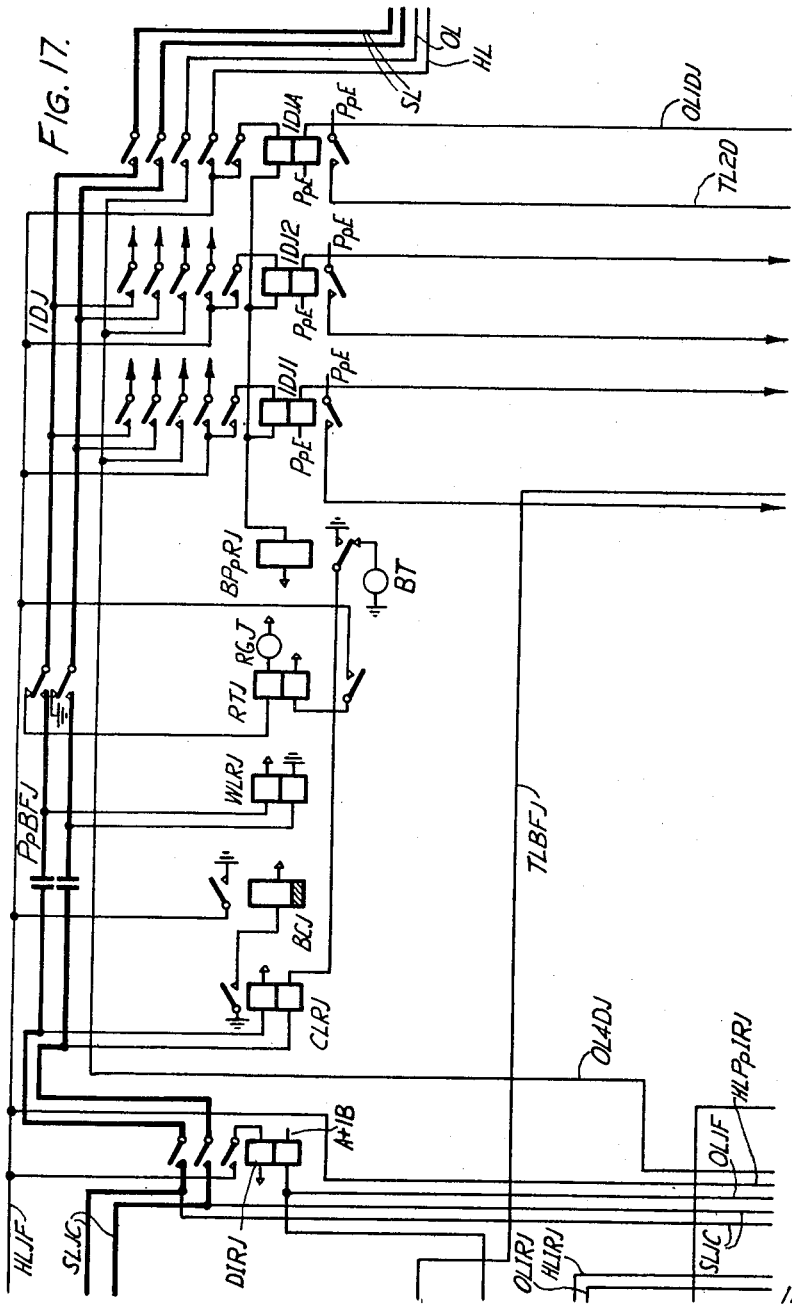

When a call is set up over a junction line a polarised relay JPR (see Figure 6) is connected across the junction line and thereby a circuit is completed for a junction line relay IJL as illustrated in Figure 16. IJL on operating connects conductor *a*E over back contact of cut off relay IJCO, front contact of relay IJL to lead JOL, thence over the back contact of relay BJ, lower windings of relay JFL, back contact of relay JFCO to operate lead OLJF and thence via back contacts and lower windings of relays JF*a*, JF*b*, JF*n* to their respective cut off relays such as IJCO and conductors *a*B, *b*B, *n*B respectively. As relay IJL connected up conductor *a*E a circuit will be completed at instant *a* for the lower winding of relays JFL, JF*a* and IJCO whereby relays JF*a*, IJCO and JFL all energise. JF*a* and IJCO lock energised through the locking contact of relay JF*a* to lead HLJF, back contact of relay JFL to earth on lead JHL until relay JFL energises and connects earth direct. In the meanwhile JCO and JF*a* jointly connect junction line JC to speaking leads SLJC to earth and battery through the upper winding of relay JFL on the back contacts of relays JFCO whereby relay JFL is maintained energised over the junction line.

When relay JLF energises it connects earth to energise relay BJ whereby leads JOL and JHL are extended to another junction finder conveniently referred to as P*q*JF so as to enable the next idle junction finder to be used for the next call. Relay BJ also connects lead P*p*E to lead TLBFJ to mark busy the battery feed equipment P*p*BFJ to other calls while relay JFL on operating removed the connection of lead P*p*E to OLIRJ and connected battery thereto. Relay BJ also connected earth to HLIRJ. OLIRJ extends via Figure 17 to Figure 18 and through the back contacts of relay BJ*a* to operate lead OLIRJ*a* and thence via the upper windings of relays JP*p*a, JP*q*a, JX*x*a and their respective cut off relays such as JFCO (Figure 16) to conductors P*p*E, P*q*E, X*x*E respectively. As the junction finder considered belongs to the route P*p* it is clear that there will be no short-circuit at instant P*p* due to lead P*p*E being connected to OLIRJ while there will be a short circuit at all other instants from all other junction finders which are not in a calling condition, that is, with their line relays de-energised. Consequently at instant Pp in the cycle relays JPpa and JFCO energise. JFCO locks energised direct to earth placed on HLJF by JFL. JFCO opens circuit of relay JFL which releases shortly after but not before a circuit is completed from the calling exchange through operated contacts of IJCO, JFa, JFCO, JPpa for line relay AJa and relay BJa has operated due to AJa operating and placed earth on HLPpIRJ to maintain relays JCO, JFa and JFCO energised.

Figure 18:
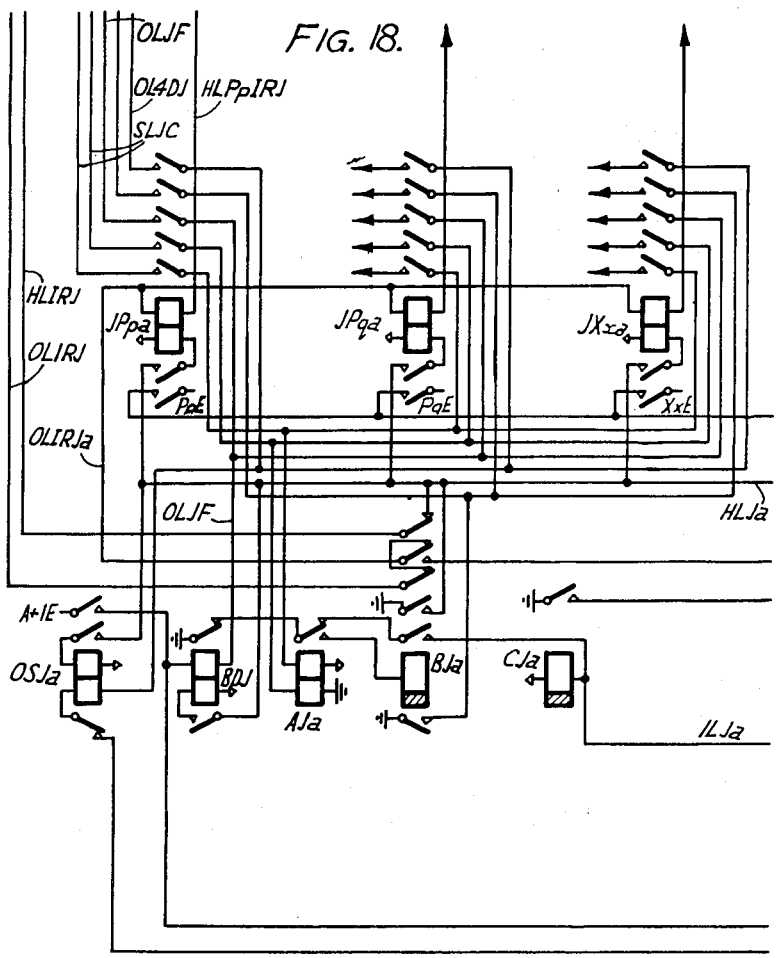
Figure 19:
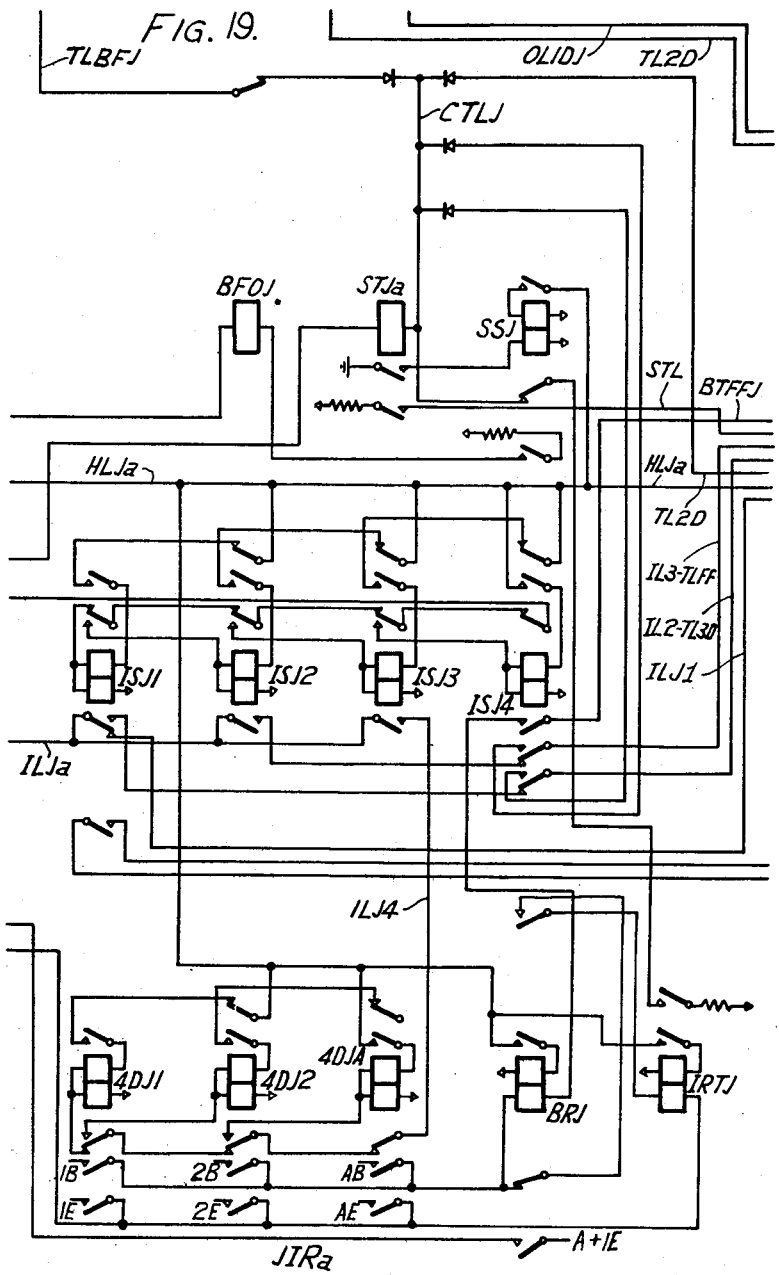
Figure 20:
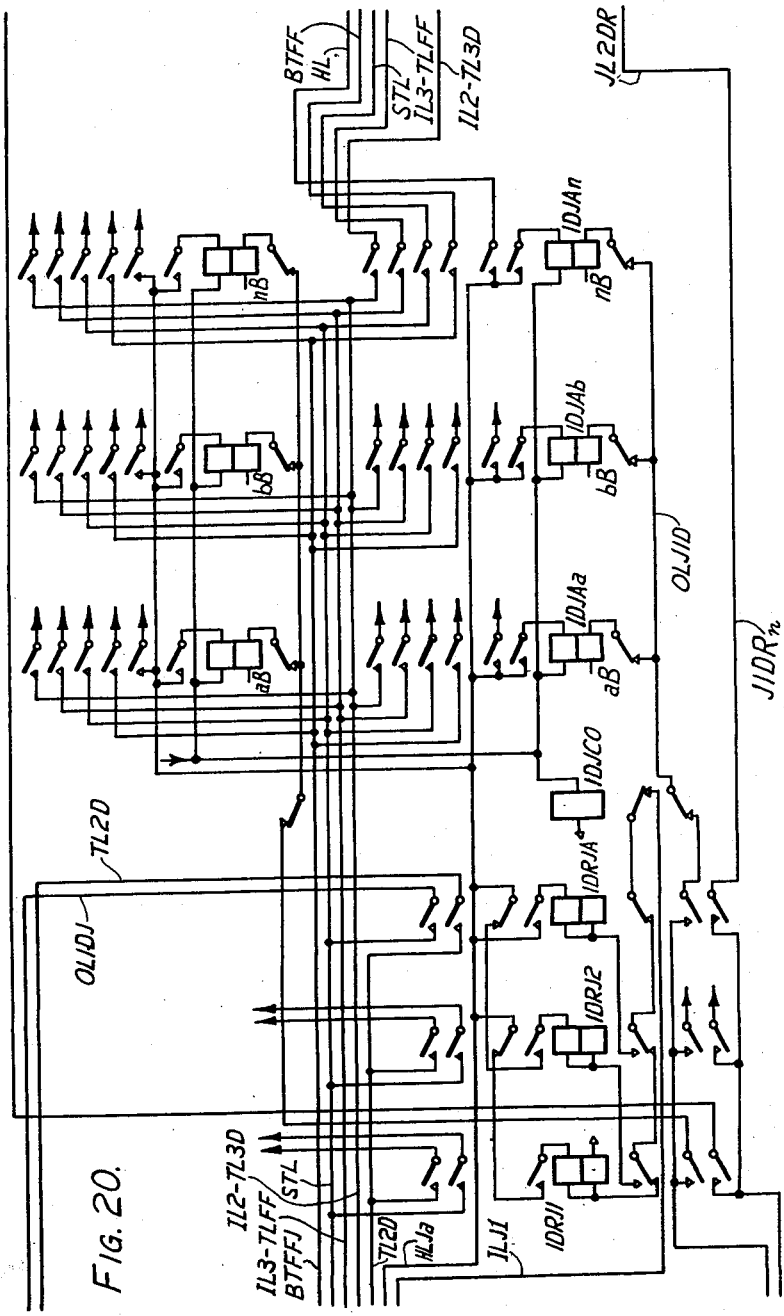

The impulse responder JIRA, Figure 18, is now ready to receive impulses transmitted from the distant exchange. On the first impulse of the series corresponding to the first numerical digit the relay AJa releases and completes a circuit for relay CJa and over lead 1LJa, back contact of 1SJ1, for the lower winding of relay 1D1J. CJa energises and completes a circuit through the back contacts of relays IS4J4, ISJ3, ISJ2, ISJ1 to the lower winding of relay ISJ6. ISJ1 partially energises and closes its X contact in order to enable it to operate fully when relay CJa releases at the end of the first series of impulses. The impulsing circuit extends over the back contacts of ISJ1, lead ILJ1, back contact of relay IDJCO, back contacts of relays IDRJA, 1DRJ2, 1DRJ1 lower winding of relay 1DRJ1 to battery. Relay IDRJ1 partially operates and closes its X contact and at the end of the impulses operates fully with its two windings in series from earth on lead HLJa and extends the impulsing circuit to relay 1DRJ2. If it is assumed that the digit dialled is A, relay 1DRJA will eventually operate and open the locking circuit of the preceding relay and complete a circuit in conjunction with operated contact of ISJ1 which is now operated fully between OLJ1D, and TL2DR and including back contact of 1DJCO. From lead OLJ1D parallel circuits extend over back contacts and lower windings of relays 1DJAa, 1DJAb, 1DJAn to leads aB, bB and nB respectively. TL2DR is marked with the idle busy condition of the second digit responders which are identical with those illustrated in Figure 14 to which reference should be made for the further description which follows and it will be assumed that 2DRn is idle and is the next idle one available so that at instant n in the cycle a circuit is compled from battery on lead nB, lower winding of relay IDTAn and its back contact, OLJID, back contact of relay IDJCO, front contacts of IDJA and IS1J to lead TL2DR and earth connected thereto from conductor nE due to the de-energised condition of relays 2DSR and 2DH in responder 2DRn. IDJAn therefore operates and locks operated in series with relay IDJCO which latter opens the operating circuit between TL2DR and OLJ1D. Leads HL', BTFF, STL, IL3—TLFF, 1L2—TL3D are then extended to 2DRn. The second digit is transmitted to 2DRn over operated contact of 1SJ1 after which IS2J operates and the impulsing circuit is extended to IL3—TLFF. 2DRn is operated as previously described in connection with a local call to select an idle third digit responder 3DRn to which the leads HL, BTFF, STL, 1L3—TLFF are extended. 3DRn then operates as described with reference to Figure 15 in response to the third digit and the fourth digit is received on 4DRJ which comprises the relays 4DJ1, 4DJ2, 4DJA. The impulsing circuit is extended by IS3J on the termination of the third digit to lead IL4J and thence over the back contacts of relays 4DJA, 4DJ2, 4DJ1 to the lower winding of relay 4DJ1 and battery. Relay 4DJ1 operates partially on the first impulse and fully on its completion from earth on HLJa. Similarly 4DJ2 operates for the second impulse and 4DJA for impulse number A.

If it is assumed that the fourth digit dialled is A, 4DAJ will lock operated and connect AE to the lower winding of relay BRJ when the other terminal of relay BRJ is connected to lead BTFFJ and thence over the front contact of ISJ4 to lead BTFF which is extended through the digit respondenrs 1DRJ, 2DRn, 3DRn to ascertain the idle and busy condition of the groups of lines whose first three numerical digits are AAA.

If the wanted line AAAA is busy then lead AE will be connected to BTFF and a circuit will be completed for the lower winding of relay BRJ. BRJ energises and locks energised through its upper winding to lead HLJa, and connects up lead A+1E to the upper winding of relay BDJ and thence to lead OLJF, lower winding of relay DIRJ (Figure 17) to lead A+1B so that a circuit is completed for the upper winding of relay BDJ and DIRJ at instant A+1 in the cycle. BDJ energises to open the circuit of relay BJa which releases shortly after. In the meanwhile relay DIRJ on operating locks operated to lead HLJF and extends leads SLJC to relay CLRJ. CLRJ therefore energises in series with the calling junction line and also completes a circuit for relay BCJ which operates and applies earth to lead HLJF.

Shortly after this operation has taken place relay BJa (Fig. 18) will release due to its circuit being opened by BDJ to remove earth from hold lead HLPpIRJ which is replaced by earth provided by relay BCJ to keep all holding relays required for the talking circuit energised in dependence upon a control from the distant exchange, BJa also removes hold earth from hold lead HLJa whereby all the relays in the impulse responders JIRa, 2DRn, 3DRn are released as well as relay JPpa.

Busy tone is fed from busy tone generator BT from the back contact of BPpRJ (Figure 17) lower winding of CLRJ to the distant exchange to give a busy signal to the calling subscriber. When the calling subscriber hangs up a circuit for relay CLRJ is opened. Consequently BCJ releases and the removal of earth from the hold lead HLJF enables all the relays held thereby to release.

If the called line was free no circuit will be completed for relay BRJ and consequently when relay IS4J operates at the end of the fourth series of impulses, a circuit is completed for relay IRTJ as follows: battery on lead AB, at instant A on a cycle front contact of 4DJA, back contact of BRJ, front contact of ISJ4 lower winding of relay IRTJ front contact of 4DJA to earth on lead AE of the same instant A. Relay IRTJ energises, locks energised to lead HLJa and connects battery through guard resistance, back contact of SSJ to the common test lead CTLJ. CTLJ is marked with earth if any equipment in a route is not available for the desired call at an instant in a cycle corresponding to the route in which the busy equipment is located. For instance, lead TLBFJ is marked with the idle and busy condition of all the battery feed equipments of the various routes, which have access to the calling group of junctions of which JC is one.

It will be noted that lead TLBFJ is connected through the back contact of relay BFOJ which is energised at instant Pp in the cycle due to a circuit being completed from lead PpE front contact of relay PpJa to relay BFOJ and battery connected up to an operated contact of ISJ4. This is to prevent the equipment PpBFJ being marked as busy as although it is in use it is available for the completion of a call. TL2D after selection by 4J1Ra is connected through a rectifier to CTLJ and indicates the idle or busy condition of the second digit selectors in the various routes corresponding to the digit A which was dialled and which are controlled by JIRa. Lead IL3—TLFF which is connected to lead TLFF via J1Ra, LDRn, 3DRn due to the operation of the relay IS4J4 is connected up through a rectifier to CTLJ and serves to indicate the idle and busy condition of the final finders in the various routes having the numerical significance AAA. IL2—TL3D which is connected to lead TL3D via JIRa. 2DRa is also connected up by ISJ4 to CTLJ and serves to indicate the idle and busy condition of the third digit selectors of the various routes which have the numerical significance AA. CTLJ is connected through relay STJa to OLIRJa and then via the upper windings of relays JPpa to JXxa to leads PpE to Xxe respectively connected through the respective cut off relays associated with these relays so that a relay can only operate if there is no earth placed on CTLJ at an instant assigned to it. For instance if there is no earth on CTLJ at Pp then if JPpa is the next to be tested a circuit will be completed at instant Pp from battery front contact of IRTJ over the circuit described to CTLJ and thence via STJa through the upper winding of relay JPpa, lower winding of relay JFCO, to earth on lead PpE. As JFCO and JPpa are already operated this circuit will only enable STJa to operate. STJa on operating completes a circuit for SSJ which locks energised and opens the circuit for STJa. STJa momentarily connects battery through a suitable guarding resistance to lead STL whence it enables relay IDJa (Fig. 17) of route Pp to operate over lead OLIDJ which is connected to STL by IDRJA. Relays Pp2DA (Fig. 7), Pp3DA (Fig. 8) are operated in the manner previously described with reference to a local call. In this way leads HL, OL and SL are extended from equipment PpBFJ (Fig. 17), via the first digit selector therein, a second digit selector (right half of Fig. 7), a third digit selector (Fig. 8), to the finder final QPFF (Fig. 9). Lead OL is connected on the one hand to OL4DJ and thence over the front contact of JPpa, lower winding of relay OS4Ja and its back contact to lead to which conductor AE is connected by 4DJA. On the other hand lead OL extends through the operated selectors of route Pp namely 1DJ, 2D1 and 3D1 to QPFF (Fig. 9).

As previously described QACO operated when the third digit selector was taken into use so that OL is extended to lead OLQA and as a consequence a circuit is completed from lead AE, front contact of 4DJa, back contact and lower winding of OSJa, lead OL4DJ, contact of IDJA, lead OL to OLQA, through the lower winding of relay QAA at instant A and the lower winding of relay COAA to battery on lead AB at the same instant. OSJa, COAA and QAA operate in this circuit. The latter two relays lock operated and connect leads SL through to the called line direct from the battery feeding set PpBFJ whereby a circuit for ringing current is completed from the ringing current generator RGJ, upper winding of ringing trip relay RTJ and its back contact, leads SL to the called line AA and back to earth on the back contact of relay RTJ. The called subscriber's bell is therefore rung and when he replies a circuit is completed for RTJ which operates and locks operated and switches through the called line to relay WLRJ which therefore operates and if desired reverses the connections of battery and earth through the winding of relay CLRJ so as to signal to the distant exchange that the wanted subscriber has replied and effected the metering or other like operations as may be desired. Through connections are now established and the connection in the called exchange is solely dependent upon the holding earth supplied by BCJ which is in turn dependent upon CLRJ which in turn is dependent upon the closure of its operating circuit at the distant exchange. Connection is therefore automatically released as soon as a calling subscriber hangs up and opens the circuit for CLRJ.

It will be noted that when OSJa operated it completed a circuit from a lead A+1E, upper winding of relay BDJ, lead OLJF via the front contact of relay JPpa to the lower winding of relay D1RJ and lead A+1B. DIRJ operated and completed the circuit for CLRJ which in view of BPpRJ having operated in the locking circuit of IDJA has disconnected the busy tone generator by a direct earth.

In the impulse responder JIRa, BDJ opens the circuit for BJa which releases shortly afterwards and removes earth both from the lead HLPLIRJ which is immaterial as it is also now supplied with earth from relay BCJ but also from lead HLJa to which relay PpJa and other relays are locked operated in the various impulse responders in sole dependence on BJa exclusively. The release of relay BJA therefore causes the release of all the responders.

In this case as is described in the case of the local call connection of lead OLJF over JPpa to another lead such as OLJF connected up by another relay such as JXxa would result in the setting up of a connection from the calling junction line to the battery feed equipment belonging to the route XX so that when JPpa releases the finder which has seized it on the initiation of the call will also be released. The momentary earth placed on the lead OLJF by JCO and JFa at instant "a" in a cycle will result in the relay corresponding to JFa associated with the battery feed equipment XxBF to be operated as will be apparent.

I claim:

1. In a telecommunication exchange employing finder and selector switching devices in trains extending respectively from selector finder links for setting up connections between a line of one set and a line of a second set, each comprising a plurality of independently and instantly and exclusively operable operating members, each member having a distinctive numerical significance and when operated connecting a common inlet to an outlet having a corresponding numerical significance, and having first and second sets of lines of which the first is divided into a plurality of groups and wherein the sets may correspond in whole or in part and wherein the sets are adapted for connection to each other, a plurality of finder-selector links assigned to each group of lines of the first set, each finder-selector link comprising a finder switch and a selector switch, each outlet of each finder switch having a different numerical significance for identifying a line selection of the group of the first set of lines to which it is assigned, a plurality of means to connect each line of a group of said first set to the finder switches assigned to such group, a plurality of means including additional selector switches to connect each of the selector switches to lines of said second set thereby to connect a group of lines of the first set to a line of the second set through a finder-selector link, each outlet of each selector switch of a finder-selector link having a different numerical significance for identifying a partial line selection of the second set of lines, and each outlet of said additional selector switches having a different numerical significance for identifying other partial line selections of the second set of lines, multiple connections between outlets of corresponding numerical significance of selected switches of a plurality of finder-selector links assigned respectively to several different groups of lines of said first set whereby connections from such different groups of the first set of lines are available over the same selector switch connecting means to said second set of lines and enable each group of lines of said first set to have several different selector-switch connecting means suitable for establishing connections to said second set of lines, registration means responsive to at least part of the numerical designation of a line of the first set and a line of the second set and having separate means of access to each of a plurality of switching devices in each train of finder and selector switching devices capable of establishing the required connection, such access means including operating and test leads, a testing device, cyclic means by which the testing device is successively made simultaneously responsive to the idle or busy condition of the switching devices of each train serving to connect a given incoming line of the first set to a desired outgoing line of the second set, and is operated when a train is tested of which all the switching devices are idle, and operating means under control of said testing device to effect the instantaneous and simultaneous operation over said operating leads of the operating members of at least a plurality of successive switching devices of the train selected by said testing device and complete the connection between the incoming line of the first set and the desired outgoing line of the second set.

2. In a telecommunication exchange as claimed in claim 1 including, in addition, finder switches included in two stages for connecting a series of finder-selector links and a group of subscribers' lines included in the first set of lines, so that the maximum number of subscribers' lines in the said group is determined by the product of the capacity of the finder switches of each stage.

3. In a telecommunication exchange, the combination as claimed in claim 1 including finder switches in one stage only for connecting from a series of finder-selector links to a group of lines incoming from other exchanges included in said first set of lines, the maximum number of lines in such groups being determined by the capacity of the finder switch.

4. In a telecommunication exchange as claimed in claim 1 the combination in which an outlet for selected first stage selectors each associated with a finder-selector link serving a different group of said first set of lines has corresponding numerical significance multipled together and connected to a line outgoing to another exchange.

5. In a telecommunication exchange, the combination as claimed in claim 1 including means to connect finder switches providing direct connection to subscribers' lines of a group of said first set of lines to common outlets of a selected plurality of finder-selector links of a series serving a selected group of lines.

6. In a telecommunication exchange, the combination as claimed in claim 1 including means for making the final selector switches giving direct access to subscribers' lines accessible from selector finder-selector links of every series serving the groups comprising said first set of lines.

7. In a telecommunication exchange as claimed in claim 1, means for connecting the same switch to make it serve both as a finder switch and as a final selector switch, said switch being accessible over finder switches from selected finder-selector links serving the same group of lines as the switch and accessible over selector switches from selected finder-selector links which serve the various groups of said first set of lines.

8. The combination claimed in claim 1 comprising, in addition cyclical generator adapted to supply control impulses at distinctive phases of a cycle respectively to each finder-selector link of a series, and connections for supplying such control impulses concurrently to the finder and selector switches to which such finder-selector links respectively have access so that an impulse is provided at the same phase of a cycle to a finder-selector link of each series serving a group of said first set of lines and switches accessible thereto.

9. The combination as claimed in claim 8 including means for applying control impulses generated at each phase of a cycle respectively to test circuits associated with switches accessible to a selected finder-selector link associated with each group of lines of said first set, and means responsive to the idle or busy condition of the switches with which each such test line is associated for connecting said test line if its respective switch is idle.

10. In a telecommunication exchange, the combination as claimed in claim 1, wherein the number of finder-selector links, which are selected one from each of a corresponding number of groups of such links and have selector outlets therefrom of the same numerical significance multiplied together, is equal to the number of possible outlets of different numerical significance at any stage up to the stage at which the total number of outlets of different numerical significance equals the total number of groups of finder-selector links, whereby substantially equal distribution of traffic in an exchange may be catered for.

11. In a telecommunication exchange, the combination as claimed in claim 1, wherein a limited number of outlets of the same numerical significance of selected finder switches and selected selector switches other than those connected to lines of said first and second sets, which switches are each accessible from one of a selected plurality of finder-selector links of the same group, are multiplied together where the traffic through such outlets is so low as to permit the total number of switches connected to said outlets to be reduced.

12. In a telecommunication exchange employing selector switching devices in trains for setting up desired connections each comprising a plurality of independently and instantly and exclusively operable operating members, each member having a distinctive numerical significance and when operated, connecting a common inlet to an outlet having a corresponding numerical significance and having first and second sets of leads of which the first set is divided into a plurality of groups, and wherein the sets are adapted for connection to each other, a plurality of selector switches assigned to each group of leads of the first set, the outlets of each selector having a different numerical significance for identifying a partial selection of the second set of leads, a plurality of connecting means, including additional selector switches, for connecting each of the first mentioned selector switches to leads of the second set, thereby to connect any of a group of leads of the first set to a lead of the second set through a selector switch, each outlet of said additional selector switches also having a different numerical significance for identifying other partial lead selections of the second set of leads, multiple connections between outlets of corresponding numerical significance of selector switches assigned respectively to several different groups of leads of said first set whereby connections from said different groups of the first set of leads are available over the same connecting means to a second set of leads and enable each group of leads of the said first set to have several different connecting means suitable for establishing connections to said second set of leads, registration means responsive to the numerical designation of one of said second set of leads and having separate means of access to each of the plurality of selector switching devices assigned to each group of leads of the first set and to each of the selector switching devices of succeeding stages giving access to the numerically designated lead of the second set, a testing device, cyclic means by which the testing device is successively made instantaneously responsive to the idle or busy condition of the switching devices of each train including a selector switching device of the plurality assigned to one group of leads of the first set and a selector switching device of succeeding stages giving access to a numerically designated lead of the said set and is operated when a train is tested of which all the switching devices are idle, and operating means under control of said testing device to effect the simultaneous and instantaneous operation over said operating leads of the operating members of the switching devices of the train selected by said testing device to complete independently the connection between a selector switch of a given group of leads of the first set and the numerically designated line of the second set.

13. In a telecommunication exchange having first and second sets of lines of which the first is divided into a plurality of groups, and wherein the sets may correspond in whole or in part and wherein the sets are adapted for connection to each other, finder and selector switching devices for setting up connections between any given line of the first set and any desired line of the second set, each switching device comprising a plurality of instantly and exclusively operated independent operating members, each member of a switching device having a distinctive numerical significance and connecting, when operated, a common inlet to an outlet having a corresponding numerical significance, said finder and selector switching devices being arranged in trains in distinctive routes, each route including a single finder selector link for each group of said first set of lines, and giving access over at least one finder stage to a group of lines with which it is associated and to all the lines of the second set over at least the selector connected to the finder selector link and to at least some of the lines of the second set over at least one additional selector switch accessible in common to a plurality of finder selector links, registration means including storing means responsive in accordance with the connection required, separate access means between the registration means and each of the finder and selector switches capable of setting up a required connection controlled by said storing means to connect up test leads leading from each switch of each route able to set up the connection required and cyclic means which cause those switching devices of a single route selected by the storage means to be tested simultaneously and the switching devices of the different routes to be tested successively until the testing means is operated in response to a route being found in which all the switching devices required to set up the required connection are idle, and in response to the operation of the testing means to effect simultaneous and instantaneous operation over said access means of a plurality of switching devices in the route selected.

References Cited in the file of this patent

UNITED STATES PATENTS

| | | |
|---|---|---|
| 2,261,370 | Hersey | Nov. 4, 1941 |
| 2,380,950 | Deakin | Aug. 7, 1945 |
| 2,529,166 | Lesigne | Nov. 7, 1950 |
| 2,535,511 | Ostline | Dec. 26, 1950 |
| 2,552,792 | Jones | May 15, 1951 |
| 2,568,101 | Voss | Sept. 18, 1951 |
| 2,597,007 | Kruithof et al. | May 20, 1952 |